(12) United States Patent
Tomizawa et al.

(10) Patent No.: US 10,687,462 B2
(45) Date of Patent: Jun. 23, 2020

(54) FERTILIZATION AMOUNT INFORMATION MANAGEMENT DEVICE, METHOD FOR CONTROLLING FERTILIZATION AMOUNT INFORMATION MANAGEMENT DEVICE, AND FERTILIZATION AMOUNT INFORMATION MANAGEMENT PROGRAM

(71) Applicant: Topcon Corporation, Itabashi-ku, Tokyo (JP)

(72) Inventors: Ryosuke Tomizawa, Tokyo (JP); Issei Hanya, Tokyo (JP); Shinkai Shu, Tokyo (JP)

(73) Assignee: Topcon Corporation, Itabashi-ku, Tokyo (JP)

( * ) Notice: Subject to any disclaimer, the term of this patent is extended or adjusted under 35 U.S.C. 154(b) by 160 days.

(21) Appl. No.: 15/705,554

(22) Filed: Sep. 15, 2017

(65) Prior Publication Data
US 2018/0077858 A1  Mar. 22, 2018

(30) Foreign Application Priority Data

Sep. 16, 2016  (JP) .................................. 2016-181775

(51) Int. Cl.
*A01C 21/00*  (2006.01)
*A01B 79/00*  (2006.01)

(52) U.S. Cl.
CPC .......... *A01C 21/007* (2013.01); *A01B 79/005* (2013.01); *A01C 21/005* (2013.01)

(58) Field of Classification Search
CPC .... A01C 21/005; A01C 21/007; A01B 79/005
See application file for complete search history.

(56) References Cited

U.S. PATENT DOCUMENTS

| 2012/0101634 A1* | 4/2012 | Lindores | ............. A01B 79/005 700/266 |
| 2012/0101796 A1* | 4/2012 | Lindores | ................ G06F 16/29 703/9 |
| 2012/0101861 A1* | 4/2012 | Lindores | ............... G06Q 10/06 705/7.11 |

(Continued)

FOREIGN PATENT DOCUMENTS

JP    2012247235 A    12/2012

*Primary Examiner* — Mussa A Shaawat
(74) *Attorney, Agent, or Firm* — Chiesa Shahinian & Giantomasi PC

(57) ABSTRACT

A fertilization amount information management device and the like are provided with which a manager of a farm field or the like can be free of cumbersome operation of drafting fertilization amount plans for entire farm fields and with which a dedicated fertilization amount plan tailored for an actual condition of each farm field can be drafted.

A fertilization amount information management device 10 includes a display unit. Fertilization amount plan information 56 on each of farm field portions that are portions of a farm field is generated based on measured growth information 24 that is growth information on a measured plant and is displayed on the display unit 16. Corrected fertilization amount plan information 65 indicating correction needed for each of the farm field portions is able to be input based on the fertilization amount plan information for each farm field displayed on the display unit.

10 Claims, 19 Drawing Sheets

(56) References Cited

U.S. PATENT DOCUMENTS

| | | | |
|---|---|---|---|
| 2012/0101934 A1* | 4/2012 | Lindores | G06Q 10/06 |
| | | | 705/37 |
| 2012/0109614 A1* | 5/2012 | Lindores | A01B 79/005 |
| | | | 703/11 |
| 2012/0298847 A1 | 11/2012 | Hayashi et al. | |
| 2014/0012732 A1* | 1/2014 | Lindores | A01B 79/005 |
| | | | 705/37 |
| 2014/0288850 A1* | 9/2014 | Avigdor | G05B 11/32 |
| | | | 702/19 |
| 2015/0301536 A1* | 10/2015 | Martinez | G01N 1/14 |
| | | | 700/266 |
| 2017/0270446 A1* | 9/2017 | Starr | G06Q 10/06313 |
| 2017/0287082 A1* | 10/2017 | Karube | G06Q 50/02 |
| 2018/0014452 A1* | 1/2018 | Starr | A01M 7/0089 |

* cited by examiner

F I G. 5
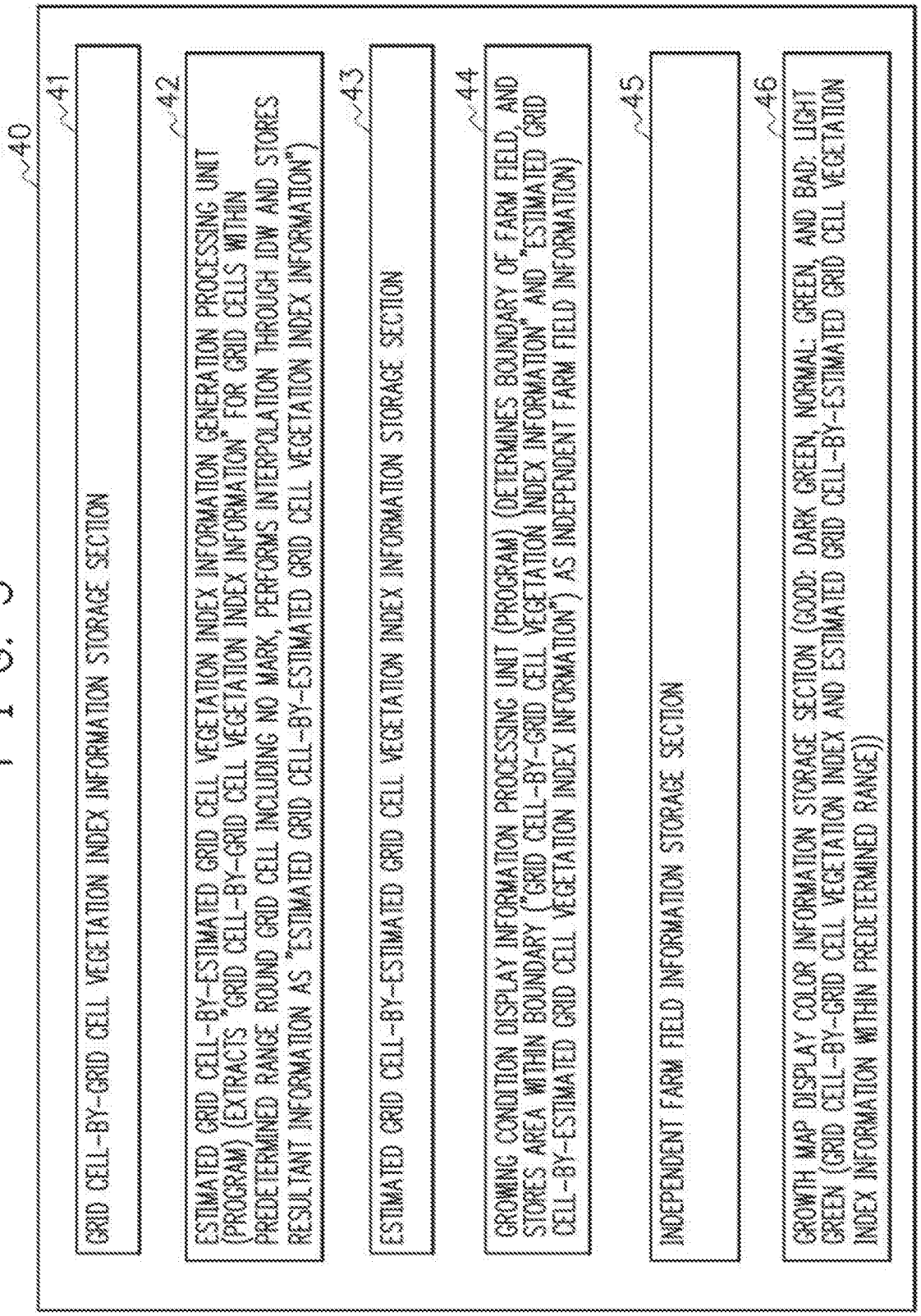

FIG. 7

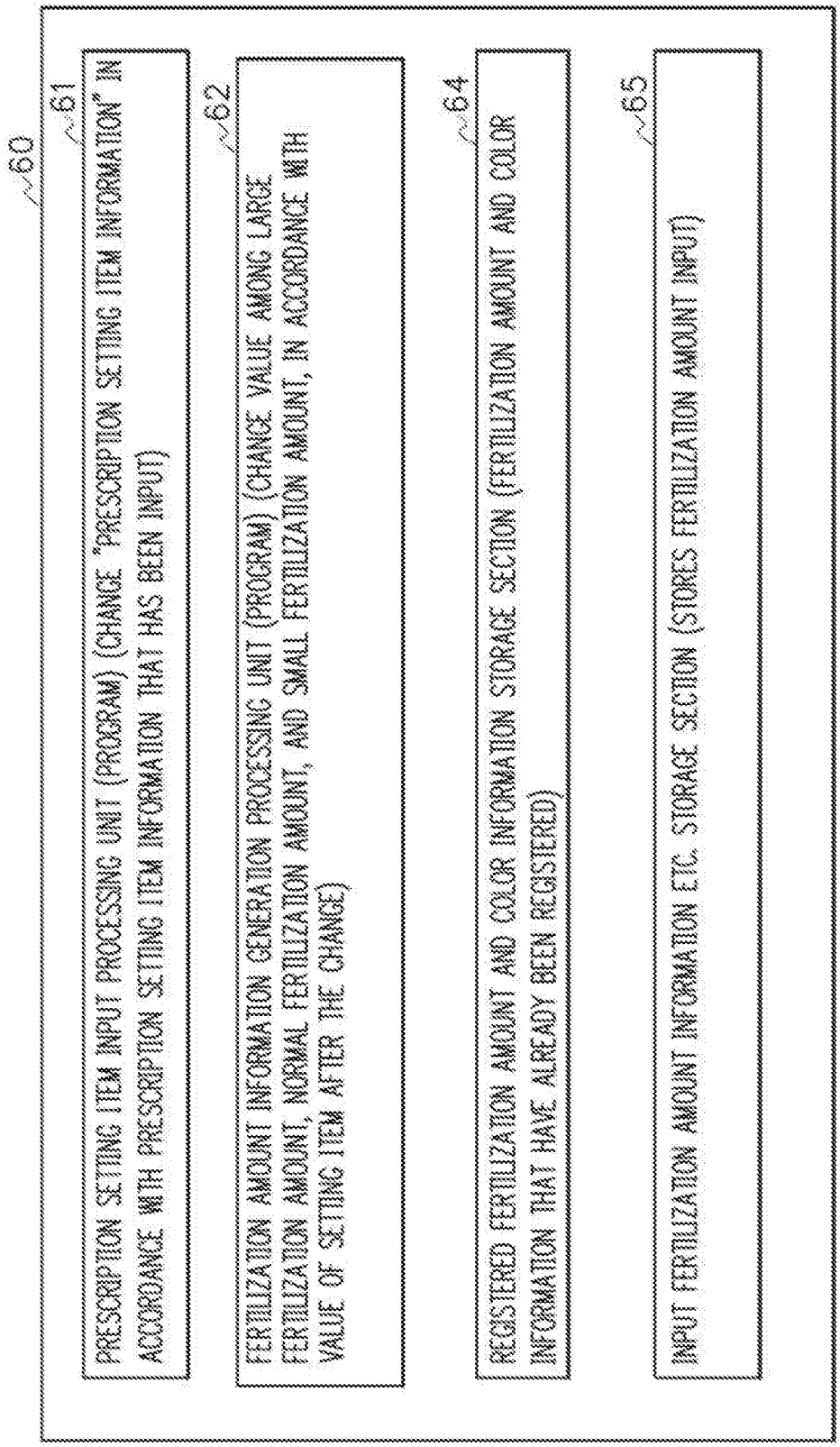

- 60
  - 61: PRESCRIPTION SETTING ITEM INPUT PROCESSING UNIT (PROGRAM) (CHANGE "PRESCRIPTION SETTING ITEM INFORMATION" IN ACCORDANCE WITH PRESCRIPTION SETTING ITEM INFORMATION THAT HAS BEEN INPUT)
  - 62: FERTILIZATION AMOUNT INFORMATION GENERATION PROCESSING UNIT (PROGRAM) (CHANGE VALUE AMONG LARGE FERTILIZATION AMOUNT, NORMAL FERTILIZATION AMOUNT, AND SMALL FERTILIZATION AMOUNT, IN ACCORDANCE WITH VALUE OF SETTING ITEM AFTER THE CHANGE)
  - 64: REGISTERED FERTILIZATION AMOUNT AND COLOR INFORMATION STORAGE SECTION (FERTILIZATION AMOUNT AND COLOR INFORMATION THAT HAVE ALREADY BEEN REGISTERED)
  - 65: INPUT FERTILIZATION AMOUNT INFORMATION ETC. STORAGE SECTION (STORES FERTILIZATION AMOUNT INPUT)

F I G. 12
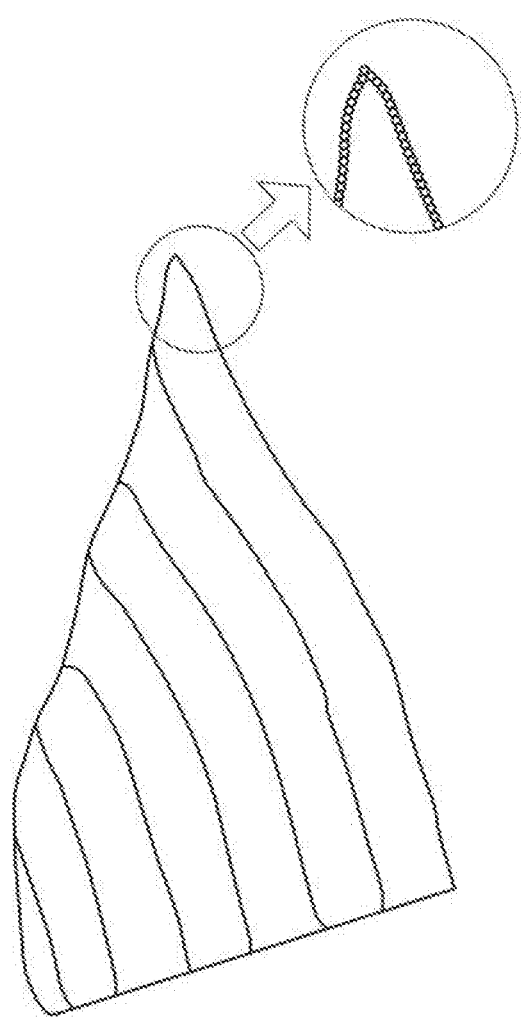

FERTILIZATION AMOUNT INFORMATION MANAGEMENT DEVICE, METHOD FOR CONTROLLING FERTILIZATION AMOUNT INFORMATION MANAGEMENT DEVICE, AND FERTILIZATION AMOUNT INFORMATION MANAGEMENT PROGRAM

TECHNICAL FIELD

The present invention relates to a fertilization amount information management device, a method for controlling a fertilization amount information management device, and a fertilization amount information management program for managing fertilization amount information based on a growing condition of plants and the like in a farm field.

BACKGROUND FIELD

Devices for collecting data on a growing condition of plants in a farm field for growing the plants such as crops have conventionally been proposed (for example, Patent Document 1). A manager of the farm field or the like plans the amount of fertilizer to be supplied to the farm field through spraying or the like, based on the data on the growing condition in the farm field.

CONVENTIONAL ART DOCUMENTS

Patent Document

[Patent Document 1] JP-A-2012-247235

SUMMARY OF INVENTION

Problem to be Solved by the Invention

It would be cumbersome for a manager or the like of a farm field to manually create the fertilization amount plan for each section of the farm field. Thus, a device or the like may automatically create the fertilization amount plan for each section, in accordance with a predetermined algorithm based on data or the like on a growing condition in each section of the farm field. However, a geographical, climate, or soil condition differs among farm fields. Thus, a fertilization amount plan uniformly created for entire farm fields might be inappropriate for the actual condition of some farm fields.

In view of this, an object of the present invention is to provide a fertilization amount information management device, a method for controlling a fertilization amount information management device, and a fertilization amount information management program with which a manager of a farm field or the like can be free of cumbersome operations for creating the fertilization amount plans for entire farm fields and with which a dedicated fertilization amount plan tailored for an actual condition of each farm field can be created.

Means to Solve the Problem

The above-described object is achieved according to the present invention by a fertilization amount information management device including a display unit, in which fertilization amount plan information on each of farm field portions that are portions of a farm field is generated based on measured growth information that is growth information on a measured plant and is displayed on the display unit, and corrected fertilization amount plan information indicating correction needed for each of the farm field portions is able to be input based on the fertilization amount plan information for each farm field displayed on the display unit.

According to the configuration, the fertilization amount plan information (such as fertilization amount map information) on each of farm field portions (such as grid cells) that are portions of a farm field is generated based on measured growth information (such as vegetation index information) and is displayed on the display unit (such as a display). Thus, the user can automatically acquire fertilization amount plan information on the entire farm field that he or she owns, and thus is free of cumbersome operations of manually creating the fertilization amount plan information based on the measured growth information.

The user can input the corrected fertilization amount plan information for each farm field portion while viewing the fertilization amount plan information displayed on the display unit. Thus, the user can easily make a change or the like on the fertilization amount plan displayed for each farm field portion. Thus, in the present invention, cumbersome operation of the user can be reduced as much as possible, and a unique fertilization amount plan conforming to the actual condition of each farm field can be achieved.

Preferably, the corrected fertilization amount plan information is implemented with color information added to the fertilization amount plan information displayed on the display unit, the color information and the corrected fertilization amount plan information are stored while being associated with each other, and the color information and the corrected fertilization amount plan information are stored while being associated with each other in a one-to-one relationship.

According to the configuration, the color is set to represent the specific corrected fertilization amount plan information (such as 12 kg/10 a). Thus, the corrected fertilization amount plan information is automatically input and reflected, simply by adding the color that has been stored to the fertilization amount plan information displayed on the display unit. Thus, the user can perform a correction operation by simply selecting color information or by performing the other like operation, instead of inputting a value or the like. Thus, the configuration enables the user to extremely easily perform the correction operation.

According to the configuration, the color information and the corrected fertilization amount plan information are stored while being associated with each other in a one-to-one relationship. Thus, one color information is prevented from being associated with a plurality of types of corrected fertilization amount plan information. Thus, an operator attempting can be prevented from adding different types of corrected fertilization amount plan information as fertilization amount plan information, when adding color information and the corrected fertilization amount plan information associated with each other or performing the other like operations.

Preferably, when the corrected fertilization amount plan information is input with approximate range information including the farm field portion of the farm field as an input target and further including a portion other than the farm field portion, the corrected fertilization amount plan information is input with the portion other than the farm field portion excluded from the approximate range information.

According to the configuration, the user may only need to set a portion including a correction target as well as other portions with approximate range information (such as a rectangle for example), and needs not to strictly set the target portion of the farm field. The portion outside the farm field is automatically excluded from the target of the corrected fertilization amount plan information. Thus, the device offers high user-friendliness.

Preferably, the corrected fertilization amount plan information is input on a screen of the display unit with the screen displaying the color information and the corrected fertilization amount plan information that have already been stored while being associated with each other.

According to the configuration, the user can select corrected fertilization amount plan information and also view and select color information corresponding to the corrected fertilization amount plan information on the same screen. Thus, the configuration, the selection and operation can easily be performed.

The object is achieved according to the present invention by a method for controlling a fertilization amount information management device including: generating fertilization amount plan information on each of farm field portions that are portions of a farm field based on measured growth information that is growth information on a measured plant and displaying the fertilization amount plan information generated on a display unit, and enabling input of corrected fertilization amount plan information indicating correction needed for each of the farm field portions based on the fertilization amount plan information for each farm field displayed on the display unit.

The object is achieved according to the present invention by a fertilization amount information management program causing a fertilization amount information management device that manages fertilization amount information on an amount of fertilizer supplied to a farm field to perform: generating fertilization amount plan information on each of farm field portions that are portions of the farm field based on measured growth information that is growth information on a measured plant and displaying the fertilization amount plan information generated on a display unit; and enabling input of corrected fertilization amount plan information indicating correction needed for each of the farm field portions based on the fertilization amount plan information for each farm field displayed on the display unit.

Advantageous Effects of the Invention

The present invention has the advantageous effect of providing a fertilization amount information management device, a method for controlling a fertilization amount information management device, and a fertilization amount information management program with which a manager of a farm field or the like can be free of cumbersome operations for creating all the fertilization amount plans for farm fields, a unique fertilization amount plan conforming to an actual condition of each farm field can be created.

BRIEF DESCRIPTION OF THE DRAWINGS

FIG. 5 is a schematic block diagram illustrating main configurations of a third various types of information storage section.

FIG. 7 is a schematic block diagram illustrating main configurations of a fifth various types of information storage section.

FIG. 12 is a schematic view illustrating "first growth data display information" with a circular mark provided to a location where vegetation index information is acquired in the farm field in map information.

DESCRIPTION OF EMBODIMENTS

Preferred embodiments of the present invention are described in detail below with reference to the attached drawings. The embodiments described below are specific preferred examples of the present invention and thus include various technically suitable limitations. Still, the scope of the present invention is not limited to the embodiments unless otherwise stated in the description below.

Figure 1:
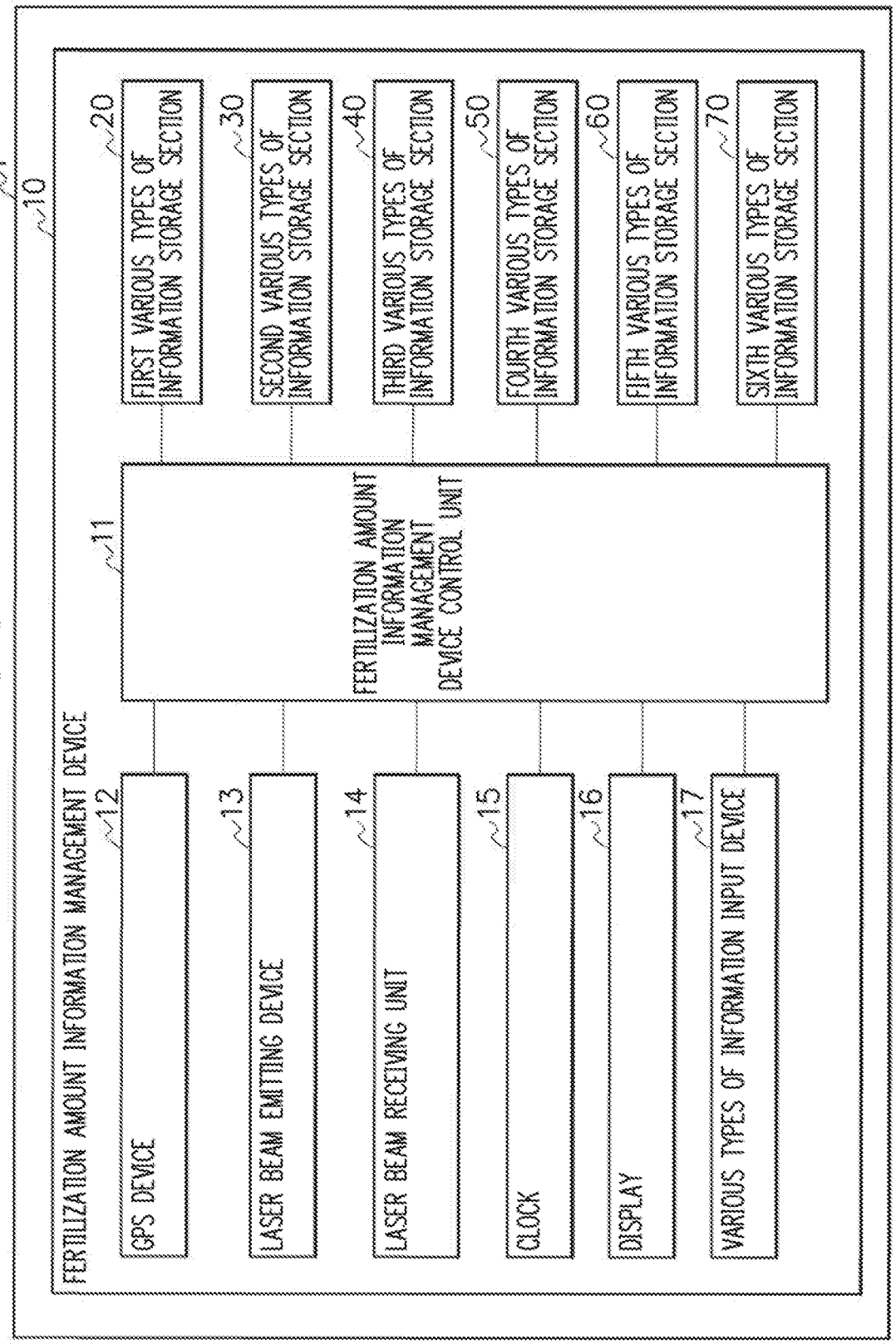
FIG. 1 is a schematic block diagram illustrating a main configuration of a tractor including a fertilization amount information management device according to the present invention.

FIG. 1 is a schematic block diagram illustrating a main configuration of a tractor 1 including a fertilization amount information management device 10 according to the present invention. As illustrated in FIG. 1, the fertilization amount information management device 10 mounted in the tractor 1 includes a Global Positioning System (GPS) device 12. The GPS device 12 uses the GPS to be capable of acquiring positional information (longitude/latitude information) on the tractor 1. The fertilization amount information management device 10 further includes a "laser beam emitting device 13" and a "laser beam receiving unit 14".

Figure 2:
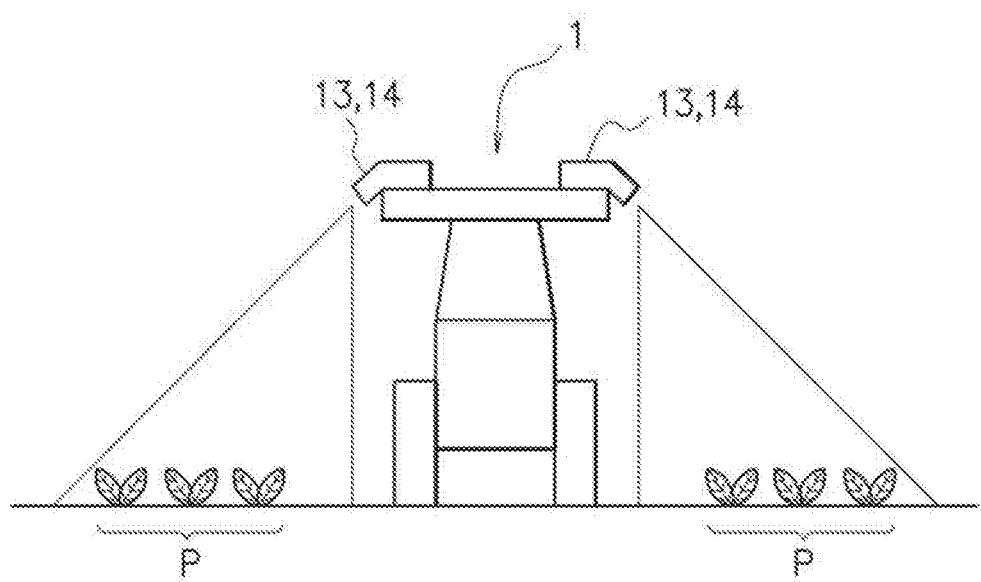
FIG. 2 is a schematic view illustrating a state where plants are irradiated with a laser beam emitted from a laser beam emitting device of the fertilization amount information management device mounted in the tractor, and the resulting reflection light is received by a laser beam receiving unit.

Functions or the like of the "laser beam emitting device 13", the "laser beam receiving unit 14", and the like are described with reference to FIG. 2. FIG. 2 is a schematic view illustrating a state where plants P are irradiated with a laser beam emitted from the laser beam emitting device 13 of the fertilization amount information management device 10 mounted in the tractor 1, and the resulting reflection light is received by the laser beam receiving unit 14.

The laser beam emitting device 13 illustrated in FIG. 1 can use a "first measurement light beam" and a "second measurement light beam" having different wavelengths. An example of the first measurement light beam includes a light beam in a red wavelength band, and an example of the second measurement light beam includes a light beam in an infrared wavelength band. The first measurement light beam and the second measurement light beam are emitted onto the same plant P as illustrated in FIG. 2.

The reflection light is received by the laser beam receiving unit 14 illustrated in FIG. 1, whereby reflectance of the light beams is acquired. Thus, a growth status of the plant P, more specifically, the amount of nutrient contained in the plant P can be recognized. The amount of nutrient is normalized difference vegetation index (NDVI, hereinafter referred to as "vegetation index information") information that is an example of measured growth information serving as plant growth information. The normalized difference vegetation index information (NDVI) is described later.

The present embodiment relies on laser beams for the measurement of the plant growth information. However, the present invention is not limited to this. The growth information may alternatively be acquired with a satellite photograph or a drone with sensors capable of measuring the growing conditions, or may be manually acquired by a worker on site.

The fertilization amount information management device 10 illustrated in FIG. 1 further includes: a "clock 15" that generates time information, a "display 16" that is an example of a display unit configured to display various types of information; a various types of information input device 17 through which various types of information are input; and a "fertilization amount information management device control unit 11" that controls the components such as the GPS device 12.

The fertilization amount information management device control unit 11 also controls a "first various types of information storage section 20", a "second various types of information storage section 30", a "third various types of information storage section 40", a "fourth various types of information storage section 50", a "fifth various types of information storage section 60", and a "sixth various types of information storage section 70" illustrated in FIG. 1. FIG. 3 to FIG. 8 are schematic block diagrams, respectively illustrating the main configurations of the "first various types of information storage section 20", the "second various types of information storage section 30", the "third various types of information storage section 40", the "fourth various types of information storage section 50", the "fifth various types of information storage section 60", and the "sixth various types of information storage section 70". These components, such as the storage section 20, are described in detail later.

The fertilization amount information management device 10 illustrated in FIG. 1 includes a computer having unillustrated components, such as a central processing unit (CPU), a random access memory (RAM), and a read only memory (ROM), connected to each other through a bus or the like.

The present embodiment is described below based on an example where a user, owning a farm field X that is a farm for the plants P in a town A in Hokkaido, acquires information on the growing condition of the plants P while driving his or her tractor 1 illustrated in FIG. 2 in the farm field X.

The user driving the tractor 1 in the farm field X operates the fertilization amount information management device 10 in FIG. 1, in the manner illustrated in FIG. 2. Thus, the laser beam emitting device 13 of the fertilization amount information management device 10 irradiates the plants P, in the same location, with two laser beams with different wavelengths (the first measurement light beam (red) and the second measurement light beam (infrared)). During this process, the laser beam receiving unit 14 acquires the reflection light corresponding to each of the light beams, and stores the reflectance (red laser beam reflectance (R) and infrared laser beam reflectance (IR)) in a "reflectance storage section 21" illustrated in FIG. 3.

Figure 3:
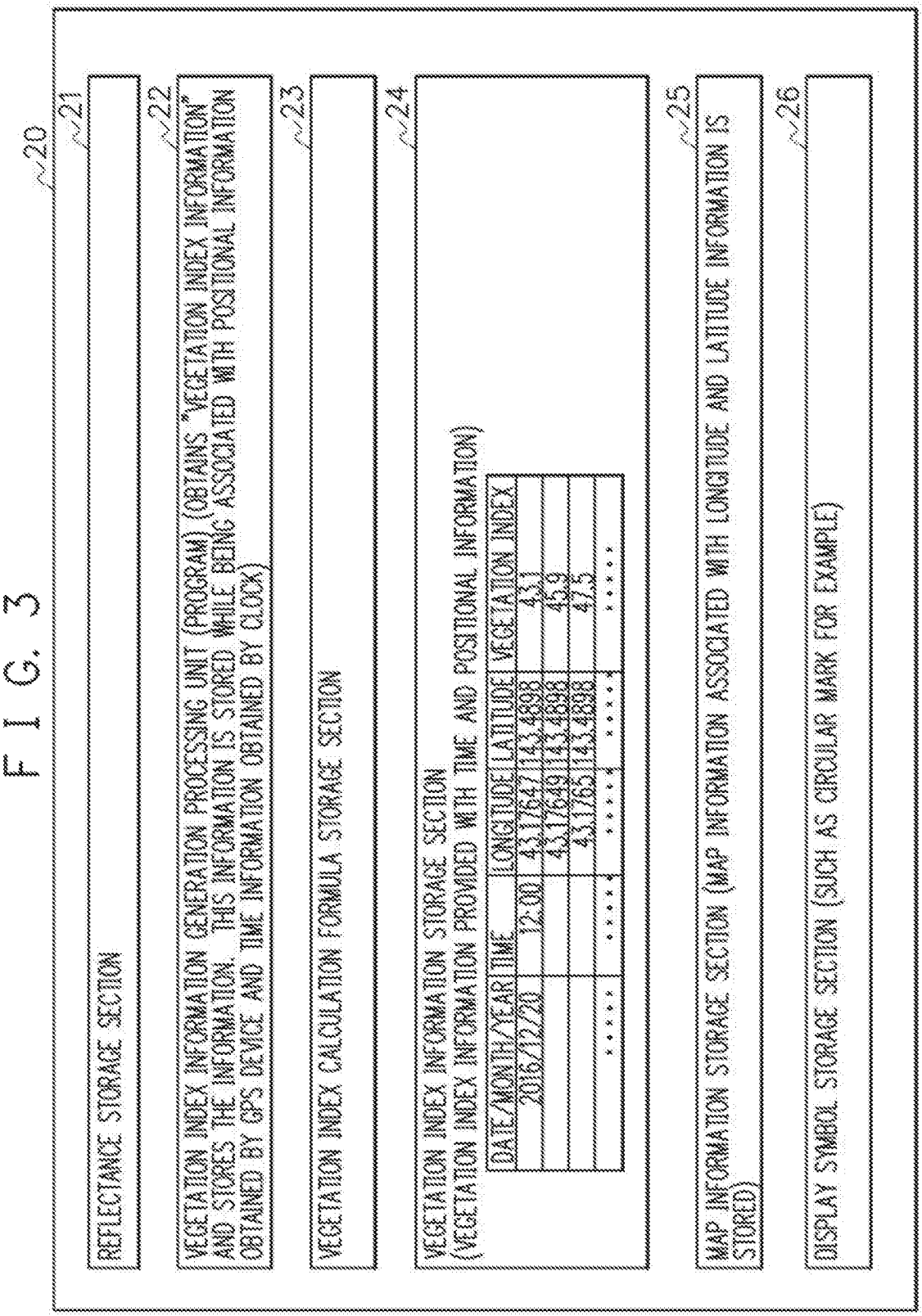
FIG. 3 is a schematic block diagram illustrating main configurations of a first various types of information storage section.

Then, a "vegetation index information generation processing unit (program) 22" illustrated in FIG. 3 operates with reference to data in the "reflectance storage section 21" and a "vegetation index calculation formula storage section 23" illustrated in FIG. 3. For example, the vegetation index calculation formula storage section 23 stores therein "vegetation index (NDVI=(IR−R)/(IR+R))".

The vegetation index is indicative of the amount of nutrient and the like contained in the plant P and the like. Thus, the "vegetation index information generation processing unit (program) 22" operates to substitute the values of the reflectance described above in the calculation formula described above, whereby the vegetation index can be obtained. The method according to the present embodiment employs the vegetation index as an index indicating how well a plant is growing. Alternatively, a method employing any other index indicating the plant growing condition may be employed.

The "vegetation index" information thus obtained is stored in a "vegetation index information storage section 24" illustrated in FIG. 3 by the "vegetation index information generation processing unit (program) 22", while being associated with the positional information (the longitude and the latitude) indicating a location of the measurement and the time information indicating the time of the measurement respectively acquired from the GPS device 12 and the clock 15 illustrated in FIG. 1.

Thus, the vegetation index information stored in the vegetation index information storage section 24 includes "vegetation index", indicating the amount of nutrient, associated with the date/month/year (for example, Dec. 20, 2015) and the time (12:00) of the measurement and the positional information indicating the longitude and the latitude.

The vegetation index information is acquired in the farm field X, and is collectively stored in the vegetation index information storage section 24 with no distinction in the vegetation index information in the farm field X.

Steps for processing the "vegetation index information" in the farm field X illustrated in FIG. 3 thus acquired into information such as a fertilization amount map easy to check by the user is described below with reference to flowcharts in FIG. 9 to FIG. 13.

Figure 9:
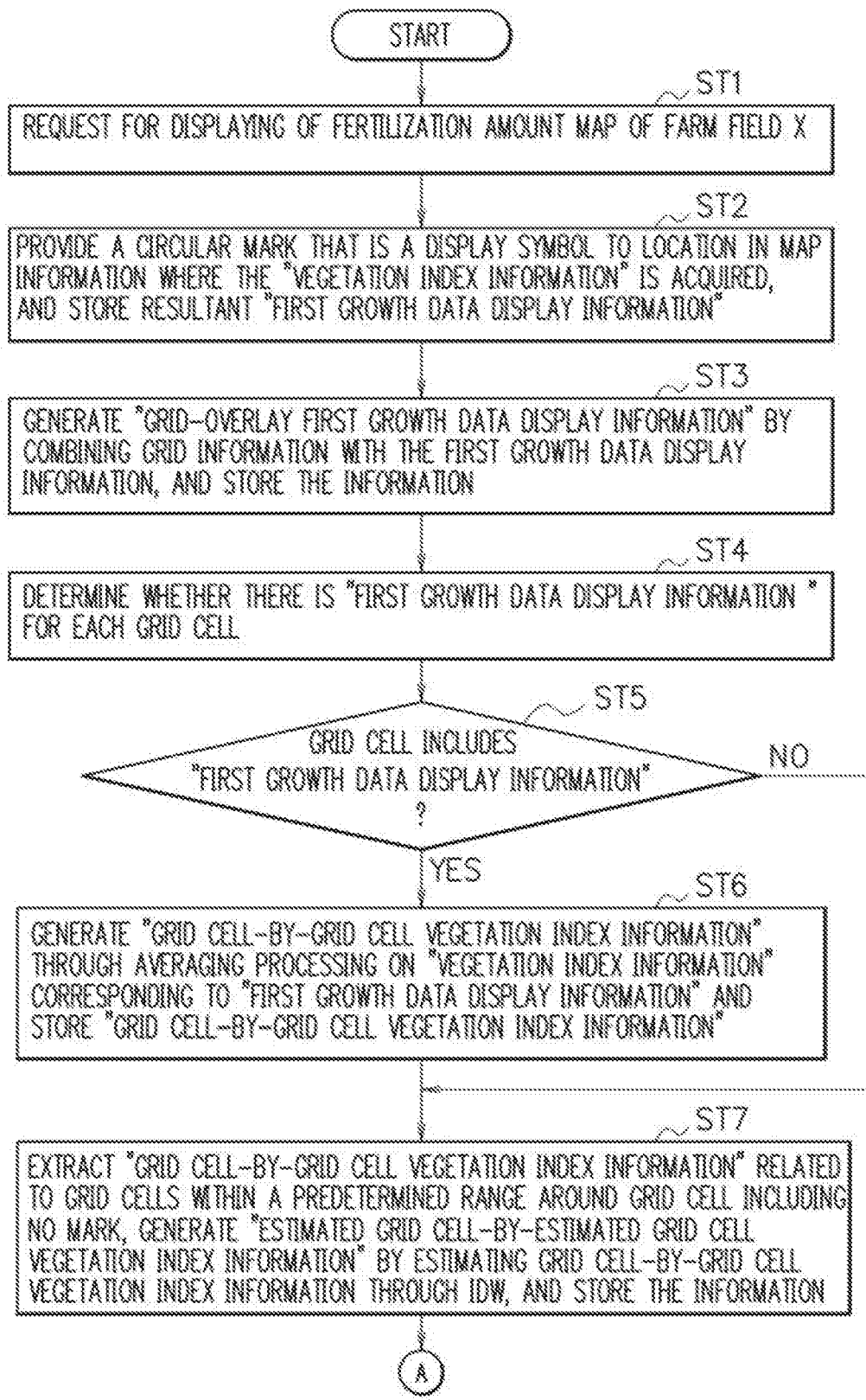
FIG. 9 is a schematic flowchart illustrating steps for creating a "fertilization amount map" indicating information for a user to supply fertilizer or the like to a farm field X, or for other like steps.
Figure 10:
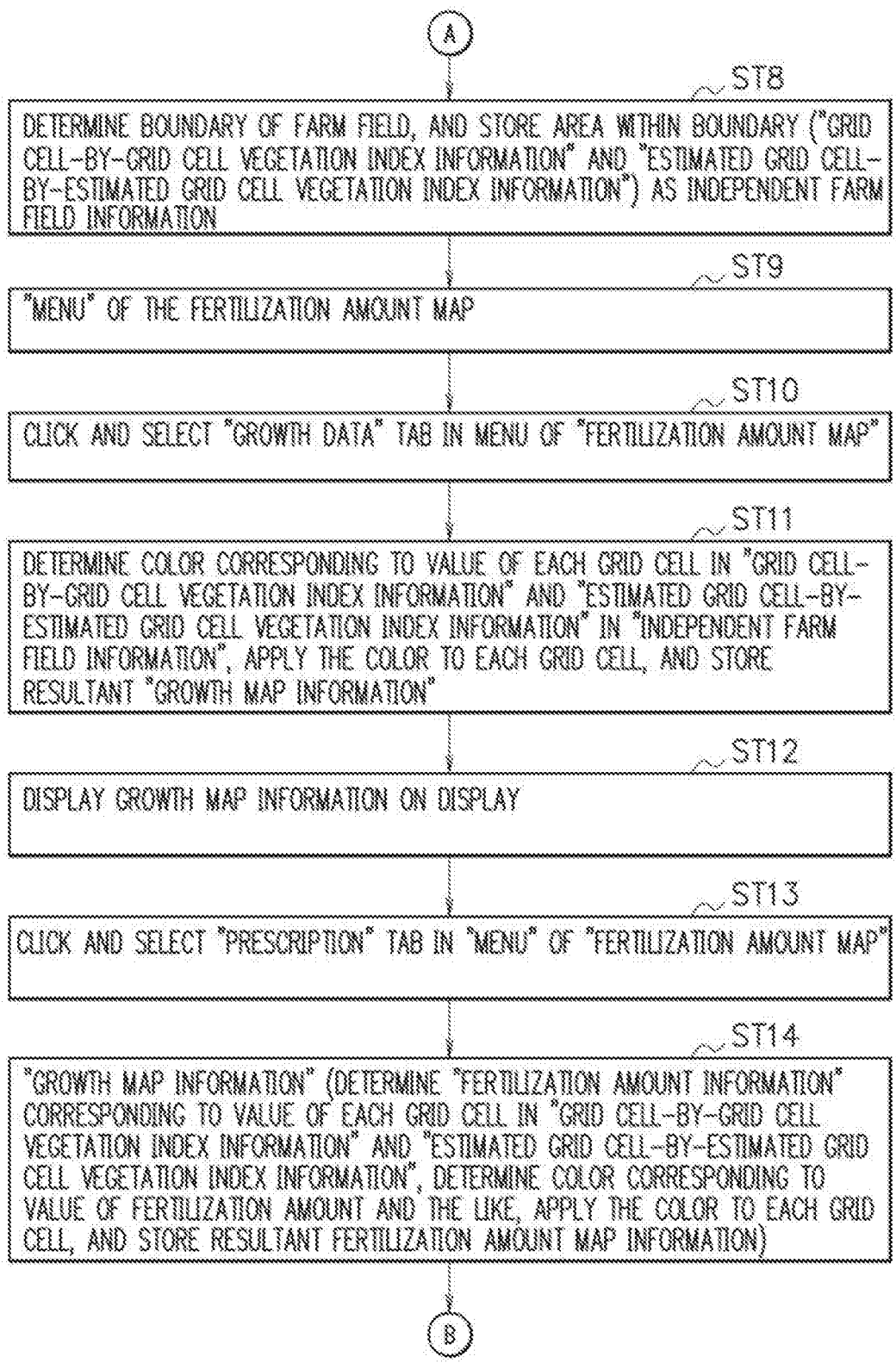
FIG. 10 is another schematic flowchart illustrating steps for creating the "fertilization amount map" indicating information for the user to supply the fertilizer or the like to the farm field X, or for other like steps.
Figure 11:
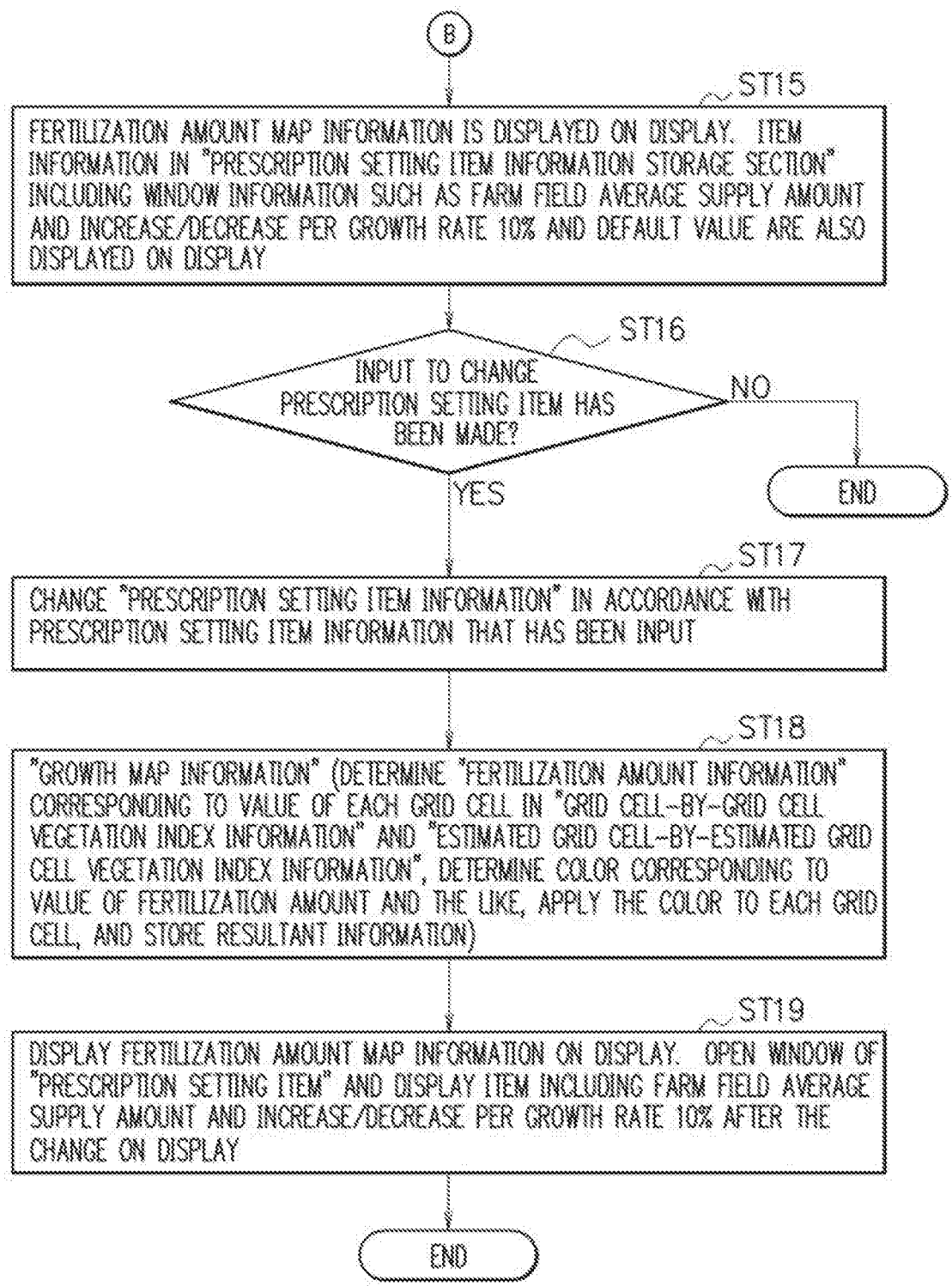
FIG. 11 is a still another schematic flowchart illustrating steps for creating the "fertilization amount map" indicating information for the user to supply the fertilizer or the like to the farm field X, or for other like steps.

FIG. 9 to FIG. 11 are schematic flowcharts illustrating steps for generating a "fertilization amount map" indicating information for the user to supply fertilizer or the like to the farm field X, or for other like steps. First of all, in step (hereinafter, referred to as "ST") 1 in FIG. 9, the user operates the various types of information input device 17 illustrated in FIG. 1 to input a request for displaying the "fertilization amount map" of his or her farm field X on the display 16.

Then, the processing proceeds to ST2. In ST2, a "first growth data display information generation processing unit (program) 31" in FIG. 4 operates with reference to a "map information storage section 25", the "vegetation index information storage section 24", and a "display symbol storage section 26" illustrated in FIG. 3 to provide a circular mark that is a display symbol to a location where the "vegetation index information" is acquired in map information, and store the resultant information, serving as "first growth data display information", in a "first growth data display information storage section 32" in FIG. 4.

FIG. 12 is a schematic view illustrating the "first growth data display information" with a circular mark provided to a location where the vegetation index information is acquired in the farm field X in the map information. The location where the vegetation index information is acquired while the tractor 1 is traveling in the farm field X is provided with a circular mark as illustrated in FIG. 12.

Then, the processing proceeds to ST3. In ST3, a "grid-overlay first growth data display information generation processing unit (program) 33" illustrated in FIG. 4 operates with reference to a "grid information storage section 34" and the "first growth data display information storage section 32" in FIG. 4. The "grid information storage section 34" stores therein grid information representing a grid indicating a section of a farm field portion for example. The grid information is combined with the first growth data display information, whereby "grid-overlay first growth data display information" is generated and is stored in a "grid-overlay first growth data display information storage section 35" in FIG. 4.

Figure 13:
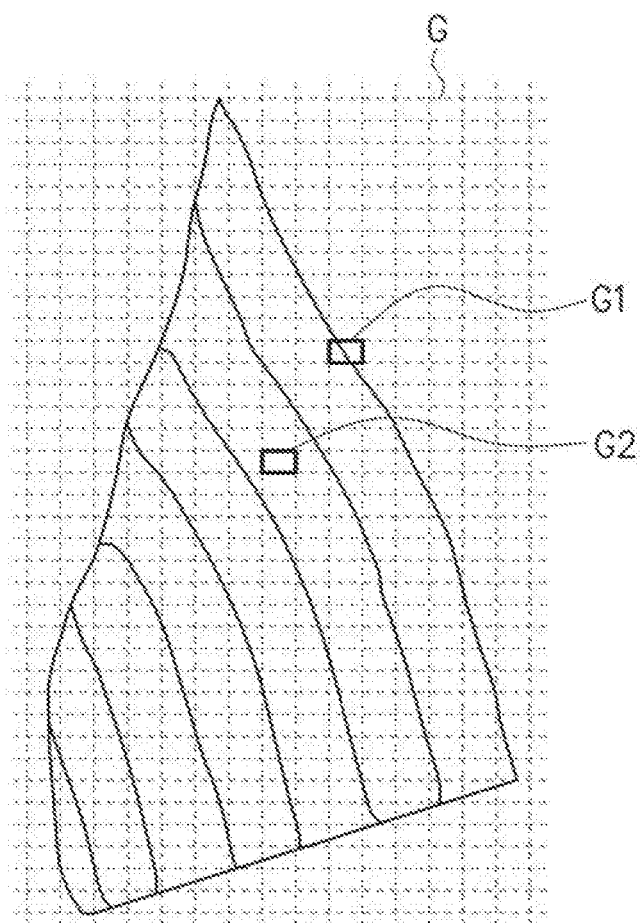
FIG. 13 is a schematic view of "grid-overlay first growth data display information" obtained by combining grid information with the farm field in FIG. 12.

FIG. 13 is a schematic view of the "grid-overlay first growth data display information" obtained by combining the grid information with the farm field X in FIG. 12. As illustrated in FIG. 13, the grid-overlay first growth data display information is generated with grid cells G stored while being combined with the "first growth data display information (circular mark)".

Then, the processing proceeds to ST4. In ST4, whether there is the "first growth data display information (circular mark)" is determined for each grid cell, with reference to the "grid-overlay first growth data display information storage section 35" in FIG. 4. For example, a grid cell G1 illustrated in FIG. 13 includes a plurality of pieces of the "first growth data display information (circular marks)". Thus, it is determined in ST5 that the grid cell includes the "first growth data display information (circular marks)", and the processing proceeds to ST6.

Figure 4:
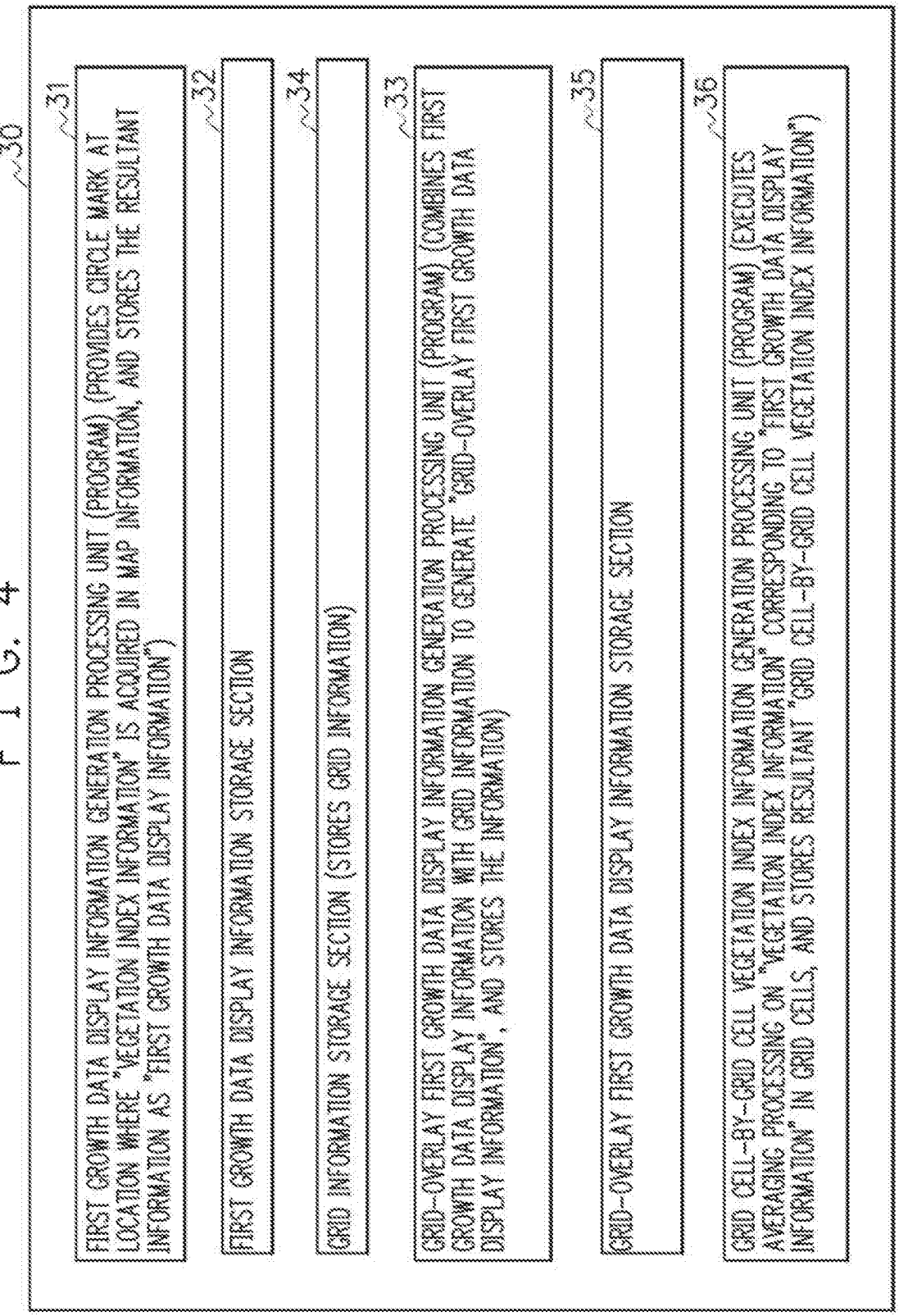
FIG. 4 is a schematic block diagram illustrating main configurations of a second various types of information storage section.

In ST6, a "grid cell-by-grid cell vegetation index information generation processing unit (program) 36" in FIG. 4 operates to extract the "vegetation index information (for example, 43.1 or the like)", in the "vegetation index information storage section 24" in FIG. 3, corresponding to the "first growth data display information (circular mark)" in each of the grid cells determined to include the "first growth data display information (circular mark)", and to execute averaging processing for each grid cell.

Thus, through the processing, the "vegetation index information (for example, 43.1 or the like)" is averaged in each of the grid cells including the "first growth data display information (circular mark)", in all the grid cells illustrated in FIG. 13. The resultant averaged information is stored as "grid cell-by-grid cell vegetation index information" in a "grid cell-by-grid cell vegetation index information storage section 41" in FIG. 5.

Then, the processing proceeds to ST7. The processing proceeds to ST7 also when the "first growth data display information (circular mark)" is determined to be not included in a grid cell such as a grid cell G2 in FIG. 13, in ST5.

In ST7, an "estimated grid cell-by-estimated grid cell vegetation index information generation processing unit (program) 42" in FIG. 5 operates with reference to the "grid cell-by-grid cell vegetation index information storage section 41" in FIG. 5, and extracts the "grid cell-by-grid cell vegetation index information" related to grid cells within a predetermined range around the grid cell including no mark.

Then, for example, an averaged "vegetation index" is estimated for the grid cell including no first growth data display information (circular mark), such as the grid cell G2 in FIG. 13 for example, through "Inverse Distance Weighting (IDW)" with which information on a grid cell, closer to the grid cell including no first growth data display information (circular mark), is provided with a larger weight.

Specifically, the IDW is a method for interpolation in which an average value is estimated for a grid cell with no value, based on values obtained by weighted averaging with a weight being the inverse of the distance. With the "grid cell-by-grid cell vegetation index information" on a grid cell including no first growth data display information (circular mark) (such as the grid cell G2 in FIG. 13 for example) thus estimated, the "estimated grid cell-by-estimated grid cell vegetation index information" is generated and is stored in an "estimated grid cell-by-estimated grid cell vegetation index information storage section 43" in FIG. 5.

As described above, for a grid cell, such as the grid cell G2, including no "first growth data display information (circular mark)", an averaged "vegetation index" can be estimated. Thus, the configuration offers high user-friendliness. In the present embodiment, the vegetation index is presented as information on a grid cell-by-grid cell basis, instead of a point-by-point basis, which is user-friendly.

Then, the processing proceeds to ST8. In ST8, an "independent farm field information processing unit (program) 44" in FIG. 5 operates with reference to information in the "grid cell-by-grid cell vegetation index information storage section 41" and the "estimated grid cell-by-estimated grid cell vegetation index information storage section 42". Specifically, the boundary of the farm field is determined, and an area within the boundary ("grid cell-by-grid cell vegetation index information 41" and "estimated grid cell-by-estimated grid cell vegetation index information 42") is stored as an independent farm field in an "independent farm field information storage section 45".

Then, the processing proceeds to ST9. In ST9, a "menu" of the "fertilization amount map" is displayed on the display 16. In ST10, the user clicks and selects the "growth data" in the menu of the "fertilization amount map". Then, the processing proceeds to ST11. In ST11, the "growth map generation processing unit (program) 51" in FIG. 6 operates with reference to the "independent farm field information storage section 45" and a "growth map display color information storage section 46" in FIG. 5.

The "growth map display color information storage section 46" stores growth map display color information indicating "good", "normal", or "bad" for each level of the growing condition, for example. Specifically, the information stored indicates that "dark green" is provided for "good", "green" is provided for "normal", and "light green" is provided for "bad". Each of "good", "normal", and "bad" is defined by a range of the grid cell-by-grid cell vegetation index and the estimated grid cell-by-estimated grid cell vegetation index information.

In ST11, a color (dark green (good), green (normal), or light green (bad)), corresponding to a value of each grid cell in the "grid cell-by-grid cell vegetation index information" and the "estimated grid cell-by-estimated grid cell vegetation index information", is determined and applied to the grid cell. The resultant "growth map information" is stored in a "growth map information storage section 52" in FIG. 6.

Figure 14:
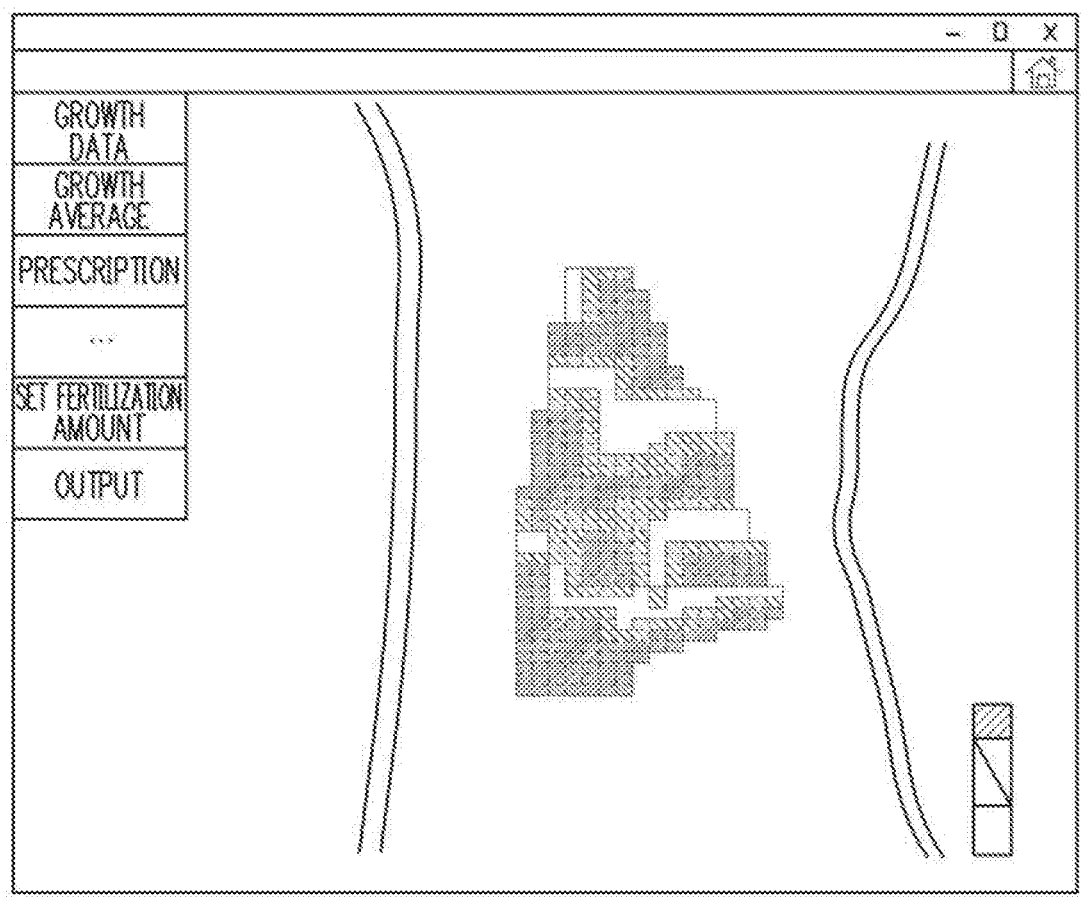
FIG. 14 is a schematic view of growth map information on the farm field X on a display.

Then, in ST12, the growth map information in the "growth map information storage section 52", examples of which include the growth map information on the farm field X, is displayed on the display 16. FIG. 14 is a schematic view illustrating the growth map information on the farm field X displayed on the display 16. In the figure, the three-line hatching represents dark green (good), the single-line hatching represents green (normal), and no hatching represents light green (bad).

When the user viewing the display 16 wants to display the fertilization amount map on the farm field X to be used as a reference for creating the fertilization amount plan for the farm field X, he or she clicks a "prescription" tab in a "menu" illustrated in a left section in FIG. 14. When a "growth data" tab in the menu is clicked, the growth map information illustrated in FIG. 14 is displayed. When a "growth average" tab is clicked, growth data averaged over a plurality of years is displayed.

Figure 6:
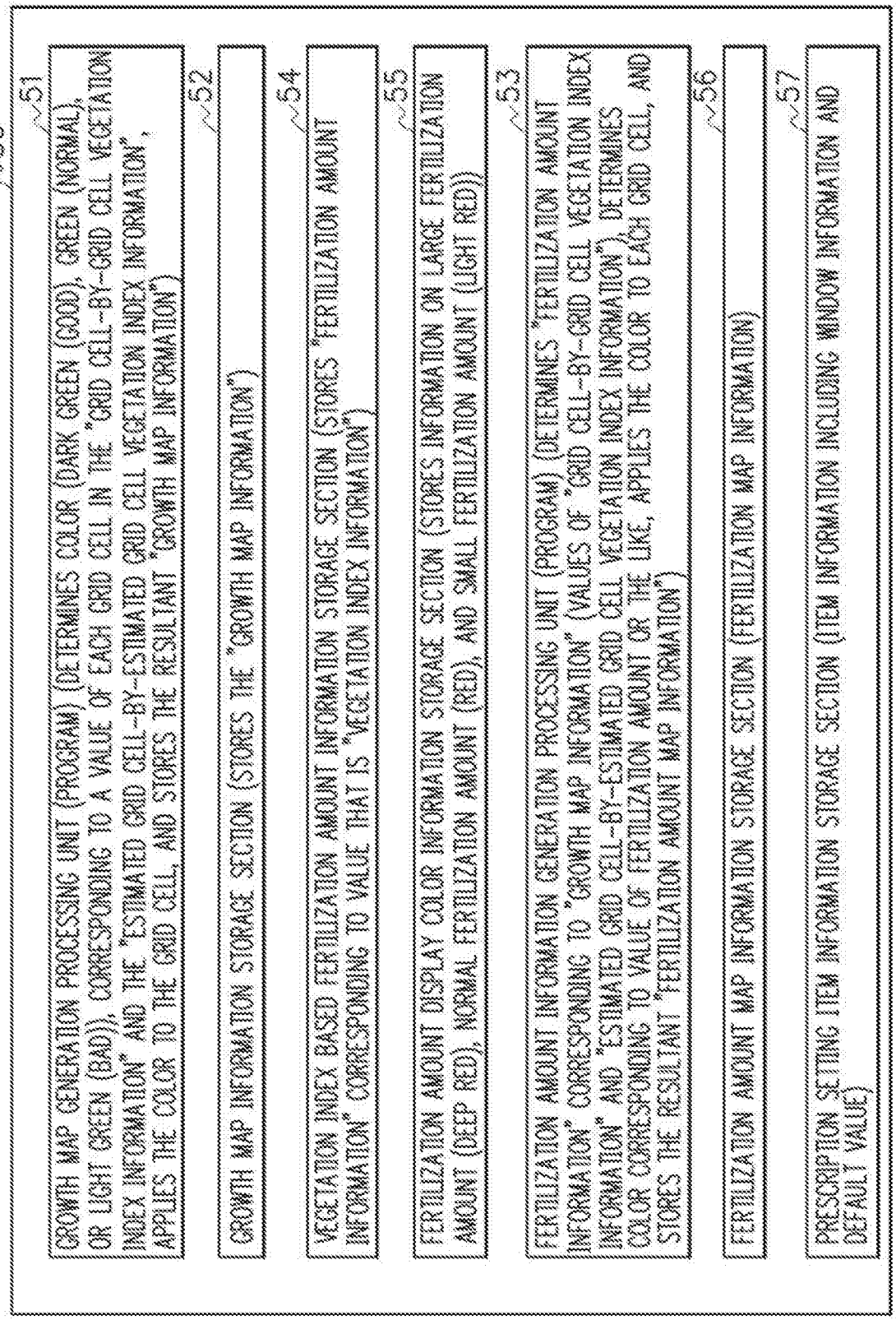
FIG. 6 is a schematic block diagram illustrating main configurations of a fourth various types of information storage section.
Figure 8:
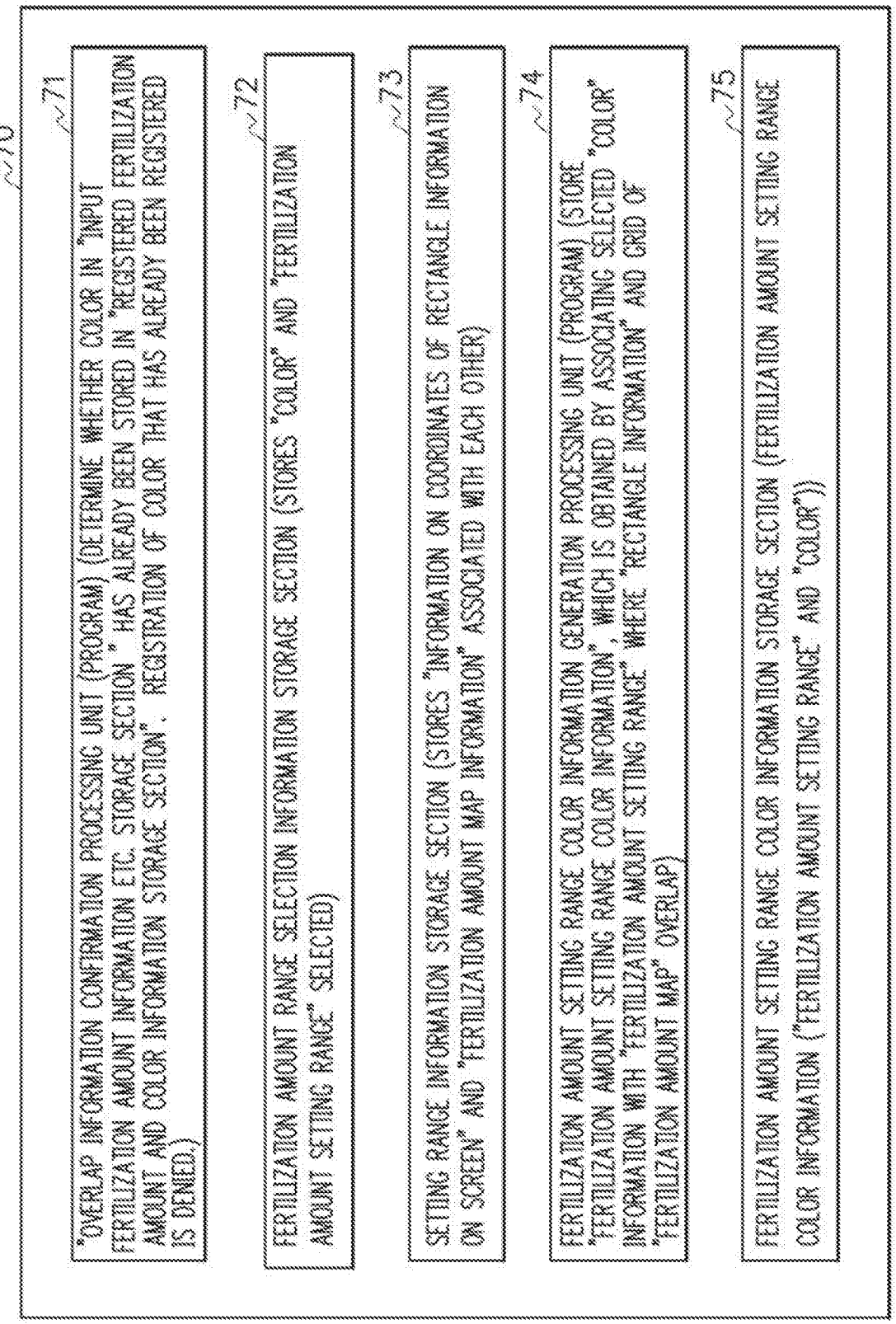
FIG. 8 is a schematic block diagram illustrating main configurations of a sixth various types of information storage section.

Then, in ST13, when the user clicks "prescription", the "fertilization amount information generation processing unit (program) 53" in FIG. 6 operates with reference to the "growth map information storage section 52" and a "vegetation index based fertilization amount information storage section 54". The "vegetation index based fertilization amount information storage section 54" stores value information, such as "fertilization amount information" in a unit of kg for example, corresponding to the values that are the "vegetation index information" in the "growth map information". Thus, in this step, the "fertilization amount information", such as numerical values in a unit of kg for example, corresponding to the value information on each grid cell of the "growth map information", specifically, the "grid cell-by-grid cell vegetation index information" and the "estimated grid cell-by-estimated grid cell vegetation index information" is determined.

This step is executed by further referring to a "fertilization amount display color information storage section 55". The "fertilization amount display color information storage section 55" stores a standard for determining a color that is an example of the color information, in accordance with the amount of the fertilizer supplied to the farm field. Specifically, for example, information stored indicates that XXX kg to XXX kg is determined to be a large fertilizer amount corresponding to "dark red", XXX kg to XXX kg is determined to be a normal fertilizer amount corresponding to "red", and XXX kg to XXX kg is determined to be a small fertilizer amount corresponding to "light red".

In this step, the color (dark red (large), red (normal), or light red (small)) corresponding to the value of the fertilization amount or the like is determined, and is applied to each grid cell. The resultant "fertilization amount map information" is stored in a "fertilization amount map information storage section 56". The "fertilization amount map information" is an example of the fertilization amount plan information.

Figure 15:
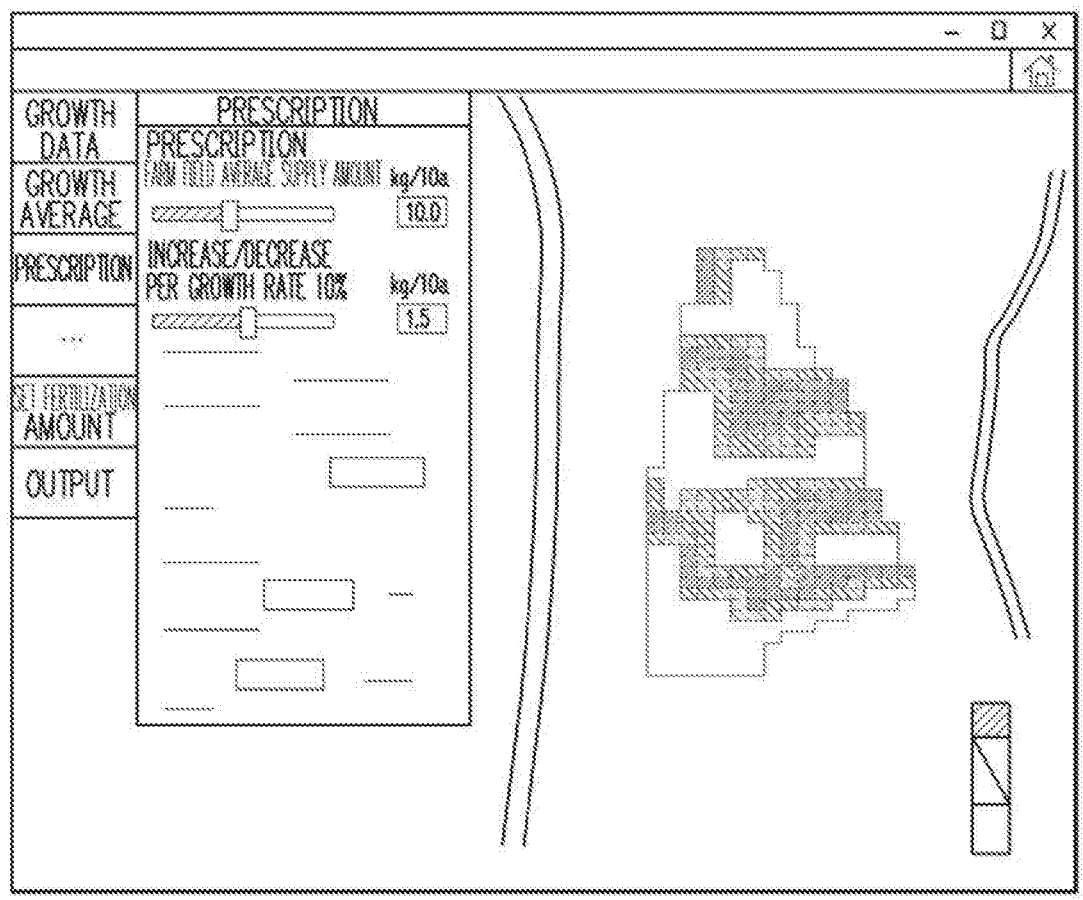
FIG. 15 is a schematic view of fertilization amount map information on the farm field on the display.

Then, the processing proceeds to ST15. In ST15, the fertilization amount map information in the "fertilization amount map information storage section 56" in FIG. 6 is displayed on the display 16. FIG. 15 is a schematic view illustrating the fertilization amount map information on the farm field X displayed on the display 16. In FIG. 15, "three-line hatching", "single-line hatching", and "no hatching" respectively represent "dark red (large fertilization amount)", "red (normal fertilization amount)", and "light red (small fertilization amount)" in the farm field X.

The fertilization amount is automatically displayed as illustrated in FIG. 15, based on data on the independent farm field information in the "independent farm field information storage section 45" in FIG. 5. Thus, the user can automatically acquire the fertilization amount plan information (fertilization amount map information) on the entire farm field X that he or she owns, and thus is free of cumbersome operations of manually creating the fertilization amount plan information based on the growth information measured.

In ST15, item information in a "prescription setting item information storage section 57" in FIG. 6, including window information and default values, is displayed on the display 16 together with the fertilization amount map information. Specifically, as illustrated in FIG. 15, items such as "farm field average supply amount" (with a default value of "10 kg/10 a") and increase/decrease per growth rate 10% (with a default value of "15 kg/10 a") are displayed.

Then, the processing proceeds to ST16. In ST16, it is determined whether the user has made an input for changing the "prescription setting item" has been made. Specifically, whether there has been an input for changing values of the "farm field average supply amount (kg/10 a)" and the "increase/decrease per growth rate 10% (kg/10 a)" is determined.

When it is determined that there has been an input for the change in ST16, the processing proceeds to ST17. In ST17, a "prescription setting item input processing unit (program) 61" in FIG. 7 operates to change the "prescription setting item information" in the "prescription setting item information storage section 57" in FIG. 6, in accordance with prescription setting item information that has been input.

Then, the processing proceeds to ST18. In ST15, a "fertilization amount information generation processing unit (program) 62" in FIG. 7 operates with reference to the "growth map information storage section 52" and the "vegetation index based fertilization amount information storage section 54" in FIG. 6. The "fertilization amount information (numerical values in a unit of kg, for example)" corresponding to the "growth map information" (values of each grid cell indicated by the "grid cell-by-grid cell vegetation index information" and the "estimated grid cell-by-estimated grid cell vegetation index information") is determined. Then, the color (dark red (large), red (normal), and light red (small)) corresponding to the value of the fertilization amount or the like is determined with reference to the "fertilization amount display color information storage section 55", and then is applied to each grid cell. The resultant information is stored in the "fertilization amount map information storage section 56".

Thus, when the user changes the value of the "farm field average supply amount" or the "increase/decrease per growth rate 10%" in FIG. 15, the fertilization amount map information is changed based on the value after the change. The resultant information is stored in the "fertilization amount map information storage section 56".

As described above, in the present embodiment, the user can easily change the automatically created data on the fertilization amount map. The values of the farm field average supply amount or the like, which are the reference information after the change, are automatically changed and stored in the "prescription setting item information storage section 57" in FIG. 6. Thus, the "fertilization amount map" is automatically created thereafter based on the information after the change. All things considered, the device offers extremely high user-friendliness.

Next, the processing proceeds to step S19. In ST19, the fertilization amount map information in the "fertilization amount map information storage section 53" in FIG. 6 is displayed on the display 16. In this process, the "prescription setting item" after the change is shown in the window. Specifically, items such as the farm field average supply amount (for example, changed to 9 kg/10 a when there has been an input for making a change to 9 kg) and the increase/decrease per growth rate 10% (for example, changed to 1.4 kg/10) a when there has been an input for making a change to 1.4 kg) after the change are displayed on the display 16, and the default values are changed to these values.

Figure 16:
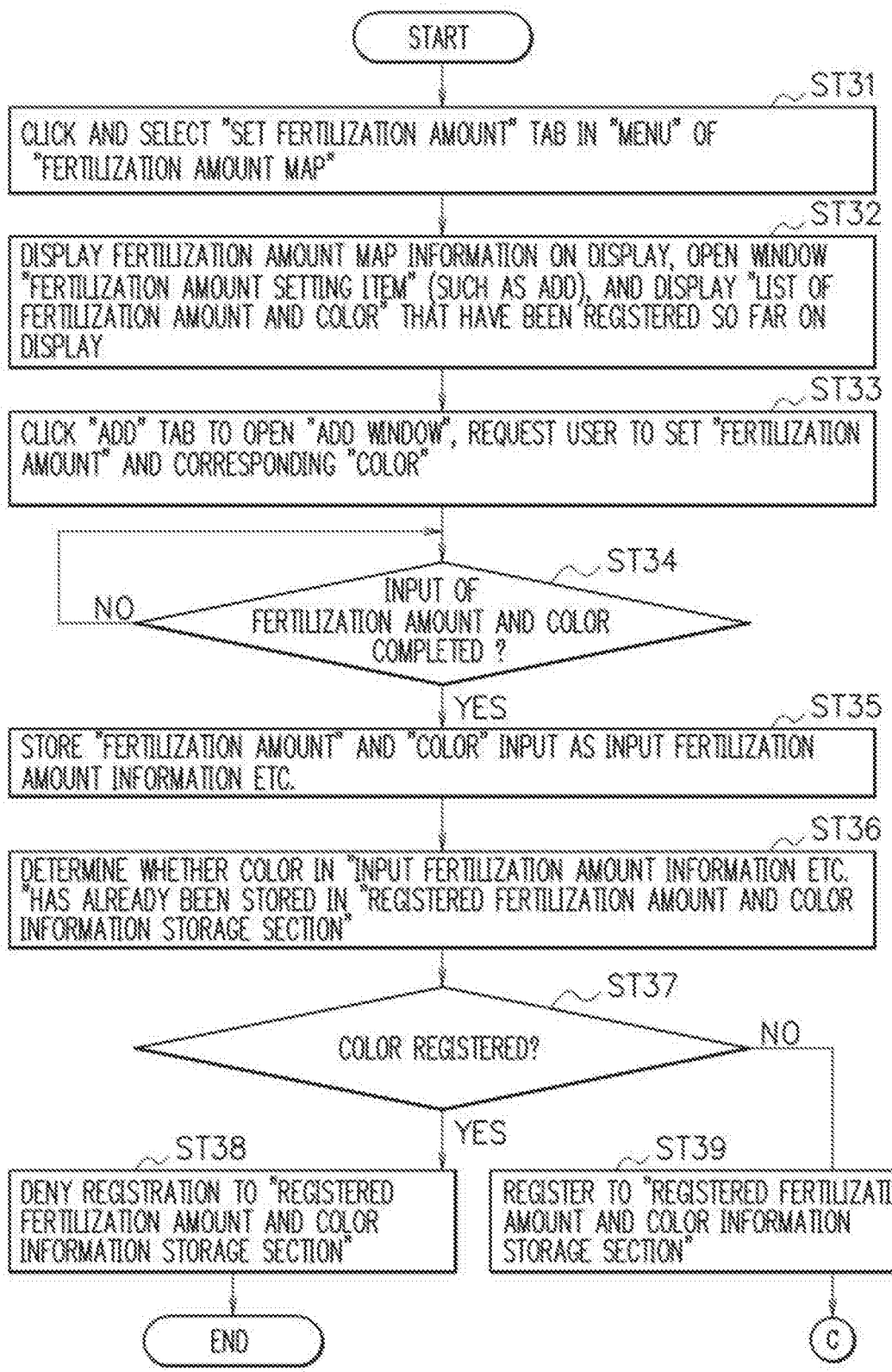
FIG. 16 is a schematic flowchart illustrating desired fertilization amount setting processing.
Figure 17:
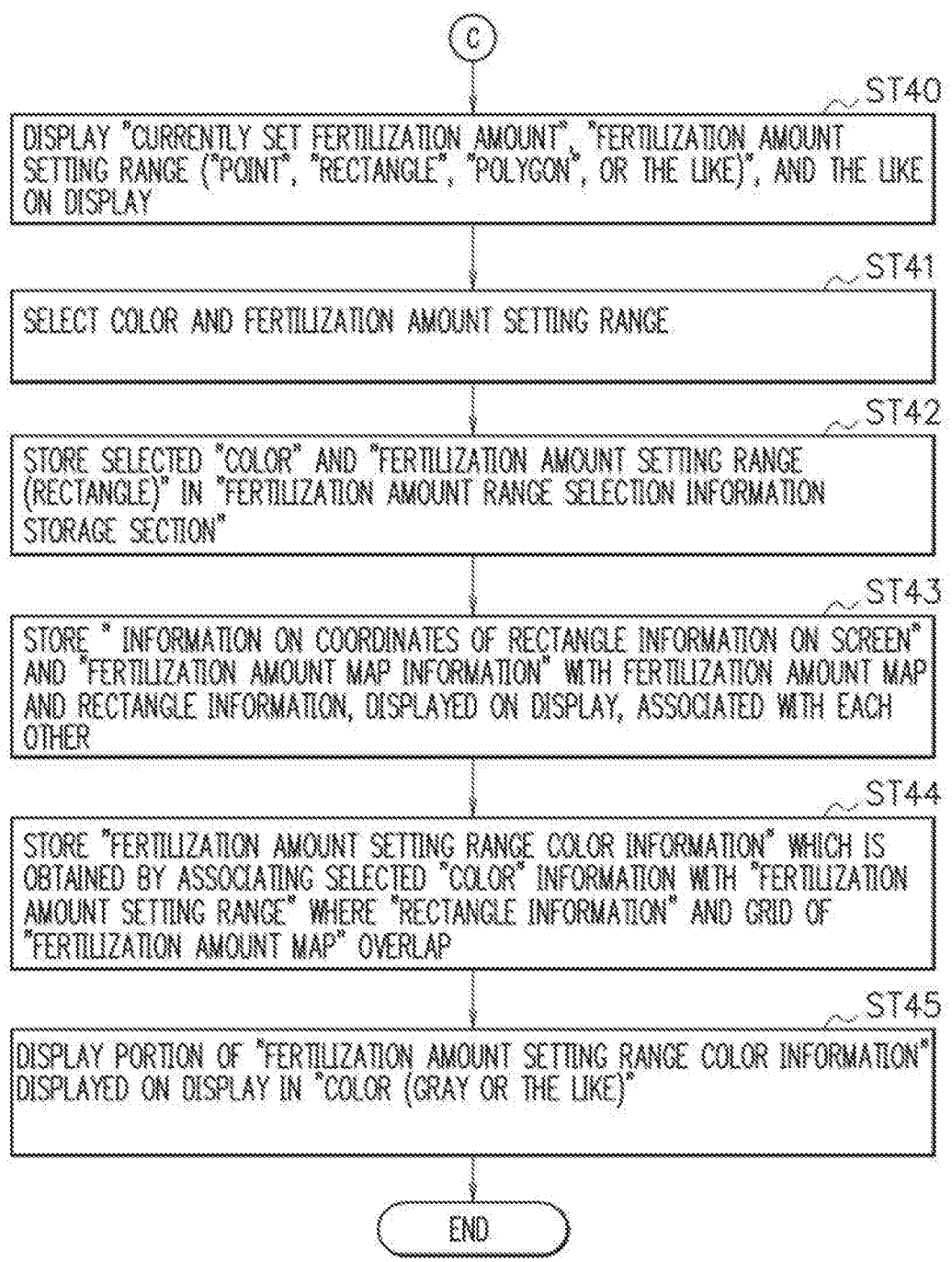
FIG. 17 is another schematic flowchart illustrating the desired fertilization amount setting processing.

Thus, the processing of creating, displaying, or performing other like processes for the "fertilization amount map" indicating information for the user to supply the fertilizer or the like to the farm field X is completed. Next, "desired fertilization amount setting processing" in which the user can set a desired fertilization amount for a portion of the farm field X is described. FIG. 16 and FIG. 17 are each a schematic flowchart illustrating the desired fertilization amount setting processing. First of all, in ST31 in FIG. 16, the user clicks and selects a "set fertilization amount" tab in a "menu" in the screen on the display 16 as illustrated in FIG. 15.

Figure 18:
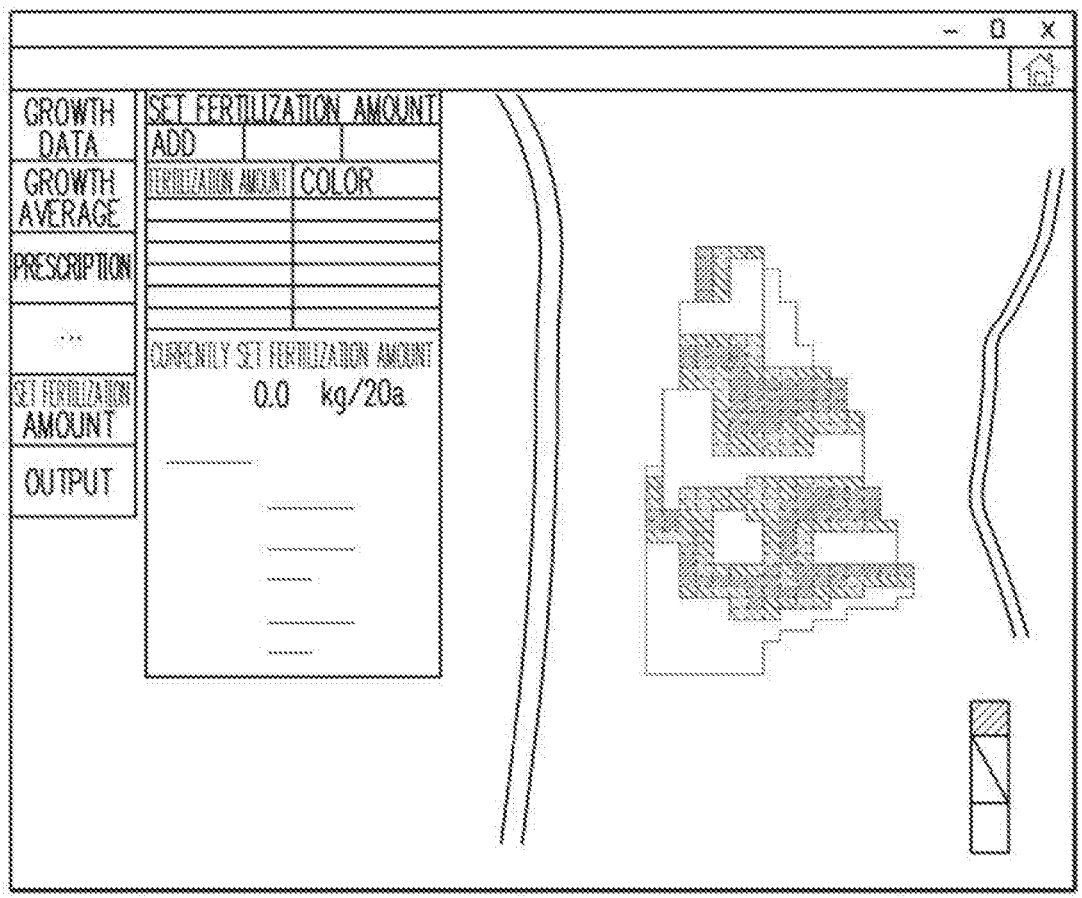
FIG. 18 is a schematic view illustrating an example of an information screen with a set fertilization amount window open.

Then, the processing proceeds to ST32. In ST32, the fertilization amount map information in the "fertilization amount map information storage section 56" in FIG. 6 is displayed on the display 16. Furthermore, a window "fertilization amount setting item" opens as illustrated in FIG. 18, and items such as "add" and "list of fertilization amount and color" that has been registered so far are displayed on the display 16. The "list of fertilization amount and color" is stored in a "registered fertilization amount and color information storage section 64" in FIG. 7, with "fertilization amount: 12 kg", and "color: black" registered for example. Thus, these pieces of information are displayed. FIG. 18 is a schematic view illustrating an example of an information screen with the set fertilization amount window open.

Figure 19:
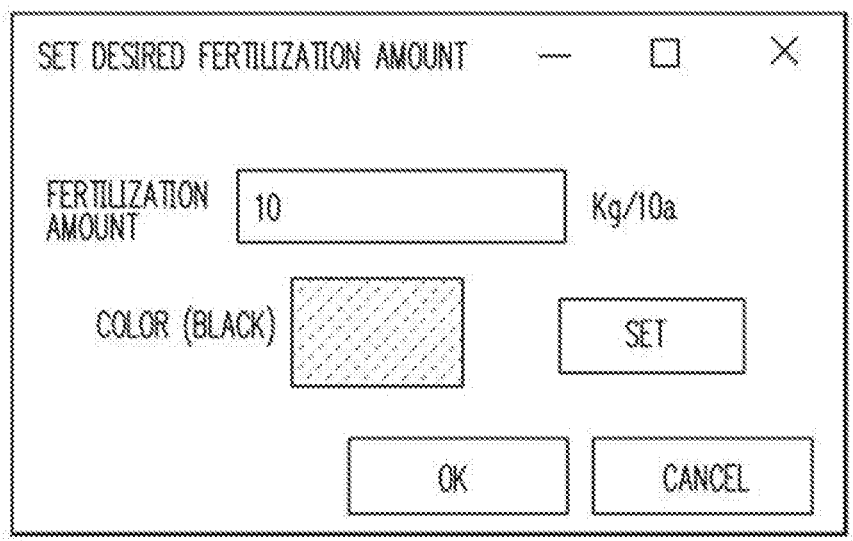
FIG. 19 is a schematic view illustrating an add window.

The processing proceeds to ST33, when the user makes a change or the like on the fertilization amount automatically shown on a part of the farm field X. In ST33, the "add" tab for the "set fertilization amount" in FIG. 18 is clicked and selected. Thus, an add window as illustrated in FIG. 19 opens. FIG. 19 is a schematic view illustrating the add window.

As illustrated in FIG. 19, in the add window, the user is requested to input a value of the "fertilization amount" that the user desires to set and color information to be registered while being associated with the value. Then, whether the input has been completed is determined in ST34. When the result of the determination is YES, the processing proceeds to ST35. In ST35, the "fertilization amount", examples of which include 10 kg/10 a, and "color", examples of which include black, which have been input are stored as input fertilization amount information in an "input fertilization amount information etc. storage section 65" in FIG. 7.

Then, the processing proceeds to ST36. In ST36, an "overlap information confirmation processing unit (program) 71" in FIG. 8 operates with reference to the "input fertilization amount information etc. storage section 65" and the "registered fertilization amount and color information storage section 64" in FIG. 7. Then, whether the color registered in the "input fertilization amount information etc. storage section 65" has already been registered in the "registered fertilization amount and color information storage section 64" is determined.

Then, the processing proceeds to ST37. When the "color" is determined to have already been registered in ST37, the processing proceeds to ST38 in which the registration is denied.

In the present embodiment, the change in the fertilization amount (kg) involves the setting of the "color" as described later, whereby different fertilization amounts (kg) can be prevented from being registered while being associated with the same color. In the example described above, "black" has already been registered in the "registered fertilization amount and color information storage section 64" while being associated with the "fertilization amount 12 kg", whereby the registration of the color black is denied.

In the present embodiment, the "list of fertilization amount and color" that have been registered so far is displayed on the display 16 as illustrated in FIG. 18 in ST32 described above, so that redundant registration of color can be prevented. Thus, the user who inputs a color can view and check information on colors that have already been registered on a screen also used for the input. Thus, the user can easily select a color.

When the color selected in ST7 is gray, which is different from black as an already registered color, it is determined that the color has not been registered, and the processing proceeds to ST39. In ST39, "10 kg/10 a" and "gray" thus input are stored in the "registered fertilization amount and color information storage section 64" while being associated with each other. Thus, "10 kg/10 a" and "gray" thus input serve as an example of corrected fertilization amount plan information.

Figure 20:
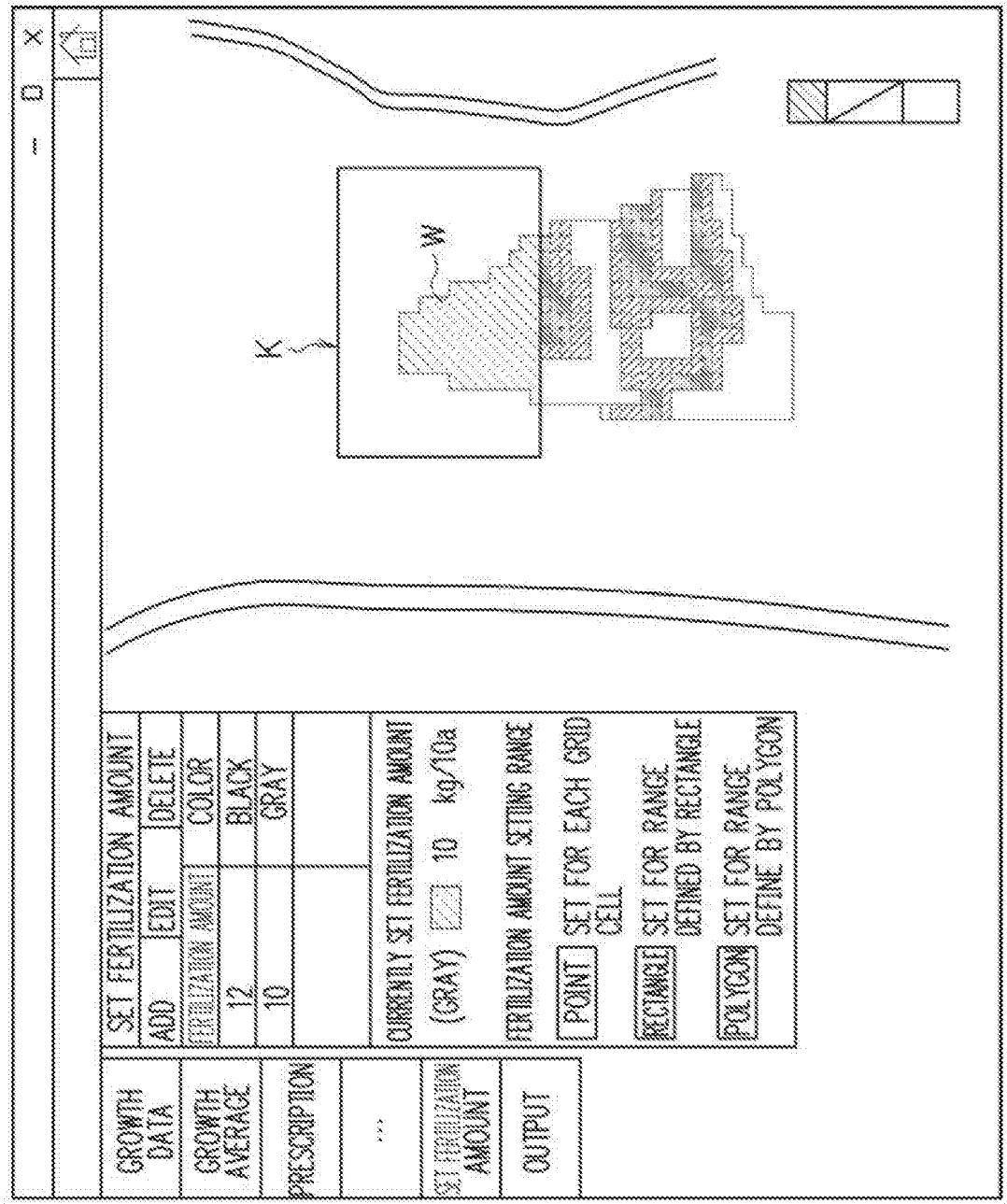
FIG. 20 is a schematic view illustrating an example of a screen with items such as a "current set fertilization amount" and "fertilization amount setting".

Then, the processing proceeds to ST40. In ST40, a "current set fertilization amount", "fertilization amount setting range ("point", "rectangle", "polygon", or the like)", and the like are displayed on the display 16 as illustrated in FIG. 20. FIG. 20 is a schematic view illustrating an example of a screen with items such as the "current set fertilization amount" and the "fertilization amount setting range". As illustrated in FIG. 20, the "current set fertilization amount", examples of which include "gray (10 kg/10 a)", is displayed above a plurality of types of regions for setting the fertilization amount for a pan or the entire farm field X, on the display 16.

For example, as illustrated in FIG. 20, "point", "rectangle", and "polygon" may be selected. Specifically, "point" corresponds to a region with which "the amount is set for each grid cell", "rectangle" corresponds to a region with which "the amount is set for a region defined by a rectangle", and "polygon" corresponds to a region with which "the amount is set for a region defined by a polygon". The "rectangle" and the like serve as an example of approximate range information.

Then, the processing proceeds to ST41. In ST41, "gray (10 kg)" displayed as described above is set and the "fertilization amount setting range" (for example, rectangle) is selected. In the present embodiment, when a color is set for the fertilization amount range thus selected, the value "fertilization amount (10 kg/10 a)" associated with the color is automatically set to the range.

Then the processing proceeds to ST42. In ST42, the "color (gray)" and the "fertilization amount setting range (rectangle)" are stored in a "fertilization amount range selection information storage section 72" in FIG. 8.

Then, the processing proceeds to ST43. In ST43, the user sets a range that is a part including the farm field X with a "rectangle" as illustrated in FIG. 20. Then, a combination of the "fertilization amount map information (for example, the fertilization amount map information on the farm field X)" in the "fertilization amount map information storage section 53" displayed on the display 16 and rectangle information (k) is stored in a "setting range information storage section 73" in FIG. 8 with the "fertilization amount map information" associated with information on coordinates of the rectangle information (k) on the screen.

Then, the processing proceeds to ST44. In ST44, a "fertilization amount setting range color information generation processing unit (program) 74" in FIG. 8 operates with reference to the "setting range information storage section 73" in FIG. 8 to store "fertilization amount setting range color information", which is obtained by associating the selected "color (gray)" information with the "fertilization amount setting range" where the "rectangle information" and the grid of the "fertilization amount map" overlap (a dashed line portion denoted with W in FIG. 20), in a "fertilization amount setting range color information storage section 75" in FIG. 8.

Then, the processing proceeds to ST45. In ST45, the portion of the farm field X, displayed on the display 16, corresponding to the "fertilization amount setting range color information" is displayed while being colored with the "color (for example, gray (10 kg/10 a)", with reference to the "fertilization amount setting range color information storage section 75" in FIG. 8. Specifically, the portion of the farm field X corresponding to the "fertilization amount setting range color information" (the dashed line portion denoted with W), where the range overlaps with the grid of the farm field X in FIG. 20, is displayed in gray.

As described above, in the present embodiment, the user may only need to set a portion including a correction target as well as other portions with a rectangle or the like, and needs not to strictly set the target portion of the farm field. The portion outside the farm field X is automatically excluded from the target of the fertilization amount setting range. Thus, the device offers high user-friendliness.

In the present embodiment, in the "set range fertilization amount range" used as a range where the fertilization amount is manually set by the user, the set fertilization amount is displayed as color information (value 10 kg/10 a). Thus, the user can easily recognize the amount by simply viewing the display 16. Furthermore, the user can manually set the fertilization amount by setting a color that has been registered, instead of using values for the setting. Thus, the amount can be easily set.

In the present embodiment as described above, a user viewing the fertilization amount map information, automatically created based on the independent farm field information on the growing condition and displayed on the display 16, can correct a part of the farm field X, indicated by the fertilization amount map information, where he or she wants to correct the fertilization amount. The user can perform the correction simply by setting the rectangle as the range and the color. Thus, the device offers extremely high user-friendliness. As described above, in the present embodiment, cumbersome operation of the user can be reduced as much as possible, and a unique fertilization amount plan conforming to the actual condition of each farm field can be achieved.

In the present embodiment, the "set fertilization amount" illustrated in FIG. 20 includes "edit" and "delete" tabs, in addition to the "add" tab. When the "edit" tab, as one of the tabs, is clicked, the fertilization amount in FIG. 19 can be changed from "10" to "12", for example. Furthermore, the color can be changed from "black" to "gray". When "edit" is used for the changing, for example, the portion W in FIG. 20 that has been displayed on the display 16 in the color before the change is automatically changed to be displayed in the color after the change.

When the "delete" tab is clicked, a desired item in the "list of fertilization amount and color" in FIG. 18 can be deleted. Thus, the "fertilization amount and color" deleted will not be displayed on the "list of fertilization amount and color" in FIG. 18 thereafter.

The present invention is not limited to the embodiments described above.

EXPLANATION OF REFERENCE NUMERALS

1 . . . tractor, 10 . . . fertilization amount information management device, 11 . . . fertilization amount information management device control unit, 12 . . . GPS device, 13 . . . laser beam emitting device, 14 . . . laser beam receiving unit, 15 . . . clock, 16 . . . display, 17 . . . various types of information input device, 20 . . . first various types of information storage section, 21 . . . reflectance storage section, 22 . . . vegetation index information generation processing unit (program), 23 . . . vegetation index calculation formula storage section, 24 . . . vegetation index information storage section, 25 . . . map information storage section, 26 . . . display symbol storage section, 30 . . . second various types of information storage section, 31 . . . first growth data display information generation processing unit (program), 32 . . . first growth data display information storage section, 33 . . . grid-overlay first growth data display information generation processing unit (program), 34 . . . grid information storage section, 35 . . . grid-overlay first growth data display information storage section, 36 . . . grid cell-by-grid cell vegetation index information generation processing unit (program), 40 . . . third various types of information storage section, 41 . . . grid cell-by-grid cell vegetation index information storage section, 42 . . . estimated grid cell-by-estimated grid cell vegetation index information generation processing unit (program), 43 . . . estimated grid cell-by-estimated grid cell vegetation index information storage section, 44 . . . independent farm field information processing unit (program), 45 . . . independent farm field information storage section, 46 . . . growth map display color information storage section, 50 . . . fourth various types of information storage section, 51 . . . growth map generation processing unit (program), 52 . . . growth map information storage section, 53 . . . fertilization amount information generation processing unit (program), 54 . . . vegetation index based fertilization amount information storage section, 55 . . . fertilization amount display color information storage section, 56 . . . fertilization amount map information storage section, 57 . . . prescription setting item information storage section, 60 . . . fifth various types of information storage section, 61 . . . prescription setting item input processing unit (program), 62 . . . fertilization amount information generation processing unit (program), 64 . . .

registered fertilization amount and color information storage section, 65 . . . input fertilization amount information etc. storage section, 70 . . . sixth various types of information storage section, 71 . . . overlap information confirmation processing unit (program), 72 . . . fertilization amount range selection information storage section, 73 . . . setting range information storage section, 74 . . . fertilization amount setting range color information generation processing unit (program), 75 . . . fertilization amount setting range color information storage section, P . . . plant

What is claimed is:

1. A fertilization amount information management device comprising a processor, a display unit, and a memory, for storing computer program instructions, which when executed by the processor, cause the processor to perform operations comprising:

associating measured growth information, which is plant growth information on a farm field that has been measured, with a location on the farm field where the plant growth information is measured;

combining map information of the farm field with grid information;

combining the grid information with the measured growth information;

generating averaged information in each of a plurality of grid cells by averaging the measured growth information in each of the plurality of grid cells;

with respect to particular ones of the plurality of grid cells not including the measured growth information, estimating growth information for the particular ones of the plurality of grid cells on the basis of the measured growth information from one or more other ones of the plurality of grid cells that are closer to the particular ones of the plurality of grid cells not including the measured growth information;

generating fertilization amount plan information on each of farm field portions that are portions of the farm field based on the measured growth information;

displaying the generated fertilization amount plan information on the display unit; and enabling input of corrected fertilization amount plan information indicating correction needed for each of the farm field portions based on the fertilization amount plan information for each farm field displayed on the display unit.

2. The fertilization amount information management device according to claim 1, wherein the corrected fertilization amount plan information is implemented with color information added to the fertilization amount plan information displayed on the display unit, the color information and the corrected fertilization amount plan information are stored while being associated with each other, and the color information and the corrected fertilization amount plan information are stored while being associated with each other in a one-to-one relationship.

3. The fertilization amount information management device according to claim 1, wherein when the corrected fertilization amount plan information is input with approximate range information including a particular farm field portion of the farm field as an input target and further including a portion other than the particular farm field portion, the corrected fertilization amount plan information is input with the portion other than the particular farm field portion excluded from the approximate range information.

4. The fertilization amount information management device according to claim 2, wherein the corrected fertilization amount plan information is input on a screen of the display unit with the screen displaying the color information and the corrected fertilization amount plan information that have already been stored while being associated with each other.

5. The fertilization amount information management device according to claim 2, wherein when the corrected fertilization amount plan information is input with approximate range information including a particular farm field portion of the farm field as an input target and further including a portion other than the particular farm field portion, the corrected fertilization amount plan information is input with the portion other than the particular farm field portion excluded from the approximate range information.

6. A method for controlling a fertilization amount information management device, the method comprising:

associating measured growth information, which is plant growth information on a farm field that has been measured, with a location on the farm field where the plant growth information is measured;

combining map information of the farm field with grid information;

combining the grid information with the measured growth information;

generating averaged information in each of a plurality of grid cells by averaging the measured growth information in each of the plurality of grid cells;

with respect to particular ones of the plurality of grid cells not including the measured growth information, estimating growth information for the particular ones of the plurality of grid cells on the basis of the measured growth information from one or more other ones of the plurality of grid cells that are closer to the particular ones of the plurality of grid cells not including the measured growth information;

generating fertilization amount plan information on each of farm field portions that are portions of the farm field based on the measured growth information;

displaying the generated fertilization amount plan information on a display unit; and enabling input of corrected fertilization amount plan information indicating correction needed for each of the farm field portions based on the fertilization amount plan information for each farm field displayed on the display unit.

7. The method according to claim 6, wherein the corrected fertilization amount plan information is implemented with color information added to the fertilization amount plan information displayed on the display unit, the color information and the corrected fertilization amount plan information are stored while being associated with each other, and the color information and the corrected fertilization amount plan information are stored while being associated with each other in a one-to-one relationship.

8. The method according to claim 6, wherein when the corrected fertilization amount plan information is input with approximate range information including a particular farm field portion of the farm field as an input target and further including a portion other than the particular farm field portion, the corrected fertilization amount plan information is input with the portion other than the particular farm field portion excluded from the approximate range information.

9. The method according to claim 7, wherein the corrected fertilization amount plan information is input on a screen of the display unit with the screen displaying the color information and the corrected fertilization amount plan information that have already been stored while being associated with each other.

10. A non-transitory computer-readable medium storing computer program instructions for managing fertilization amount information on an amount of fertilizer supplied to a farm field, which, when executed on a processor, cause the processor to perform operations comprising:

associating measured growth information, which is plant growth information on the farm field that has been measured, with a location on the farm field where the plant growth information is measured;

combining map information of the farm field with grid information;

combining the grid information with the measured growth information;

generating averaged information in each of a plurality of grid cells by averaging the measured growth information in each of the plurality of grid cells;

with respect to particular ones of the plurality of grid cells not including the measured growth information, estimating growth information for the particular ones of the plurality of grid cells on the basis of the measured growth information from one or more other ones of the plurality of grid cells that are closer to the particular ones of the plurality of grid cells not including the measured growth information;

generating fertilization amount plan information on each of farm field portions that are portions of the farm field based on the measured growth information;

displaying the generated fertilization amount plan information on a display unit; and enabling input of corrected fertilization amount plan information indicating correction needed for each of the farm field portions based on the fertilization amount plan information for each farm field displayed on the display unit.

* * * * *